United States Patent
Ozguner et al.

(10) Patent No.: US 10,403,029 B2
(45) Date of Patent: Sep. 3, 2019

(54) METHODS AND SYSTEMS FOR MULTISTAGE POST-RENDERING IMAGE TRANSFORMATION

(71) Applicant: MICROSOFT TECHNOLOGY LICENSING, LLC, Redmond, WA (US)

(72) Inventors: Tolga Ozguner, Redmond, WA (US); Miguel Comparan, Kenmore, WA (US); Ryan Scott Haraden, Duvall, WA (US); Jeffrey Powers Bradford, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 295 days.

(21) Appl. No.: 15/586,214

(22) Filed: May 3, 2017

(65) Prior Publication Data
US 2018/0322688 A1 Nov. 8, 2018

(51) Int. Cl.
*G06T 15/20* (2011.01)
*G06T 7/32* (2017.01)
(Continued)

(52) U.S. Cl.
CPC .......... *G06T 15/205* (2013.01); *G06T 3/0093* (2013.01); *G06T 3/20* (2013.01); *G06T 7/32* (2017.01); *G06T 7/70* (2017.01)

(58) Field of Classification Search
CPC ....... G06T 15/205; G06T 3/0093; G06T 3/20; G06T 7/32; G06T 7/70
(Continued)

(56) References Cited

U.S. PATENT DOCUMENTS 5,586,204 A * 12/1996 Noble ................. G06F 11/0751
382/282
5,742,749 A * 4/1998 Foran ...................... G06T 15/50
345/426
(Continued)

FOREIGN PATENT DOCUMENTS

WO 2008/022222 A2 2/2008

OTHER PUBLICATIONS

Cottam et al., "Preserving Data While Rendering", Parsons Journal for Information Mapping, 2014, 11 pages.
(Continued)

*Primary Examiner* — Jerome Grant, II
(74) *Attorney, Agent, or Firm* — NovoTechIP International PLLC

(57) ABSTRACT

Systems and methods for multistage post-rendering image transformation are provided. The system may include a transform generation module arranged to dynamically generate an image transformation. The system may include a transform data generation module arranged to generate first and second transformation data by applying the generated image transformation for first and second sampling positions and storing the transformation data in a memory. The system may include a first image transformation stage that selects the first and second transformation data for a destination image position and calculates an estimated source image position based on the selected first and second transformation data. The system may include a second image transformation stage that selects the first and second transformation data for the destination image position, retrieves the first and second transformation data from the memory, and recalculates an estimated source image position based on the selected first and second transformation data.

20 Claims, 12 Drawing Sheets

(51) Int. Cl.
*G06T 7/70* (2017.01)
*G06T 3/20* (2006.01)
*G06T 3/00* (2006.01)

(58) Field of Classification Search
USPC .......................................................... 382/296
See application file for complete search history.

(56) References Cited

U.S. PATENT DOCUMENTS

| | | |
|---|---|---|
| 7,106,347 B1 | 9/2006 | Rosenberg |
| 9,536,287 B1* | 1/2017 | Eldar ...................... G06T 5/002 |
| 2004/0156556 A1* | 8/2004 | Lopez ................... G06T 3/0093 |
| | | 382/276 |
| 2007/0201762 A1 | 8/2007 | Rosasco et al. |
| 2010/0091037 A1 | 4/2010 | Banerjee |
| 2010/0303383 A1 | 12/2010 | Huggett |
| 2012/0275725 A1 | 11/2012 | Kelly et al. |
| 2013/0070137 A1 | 3/2013 | Kelly et al. |
| 2015/0029218 A1 | 1/2015 | Williams et al. |
| 2015/0324955 A1 | 11/2015 | Cawley et al. |
| 2016/0180600 A1* | 6/2016 | Liu ......................... G06T 19/20 |
| | | 345/419 |
| 2017/0169612 A1* | 6/2017 | Cashen ................... G06F 3/013 |
| 2019/0087968 A1* | 3/2019 | Grunnet-Jepsen ...... G06T 7/521 |

OTHER PUBLICATIONS

"International Search Report & Written Opinion Issued in PCT Application No. PCT/US2018/028463", dated Jul. 9, 2018, 12 Pages.

Wolberg, G., "Digital Image Warping Passage", Spatial Transformations, Published by IEEE Computer Society Press, Jan. 1, 1990, 99 Pages.

* cited by examiner

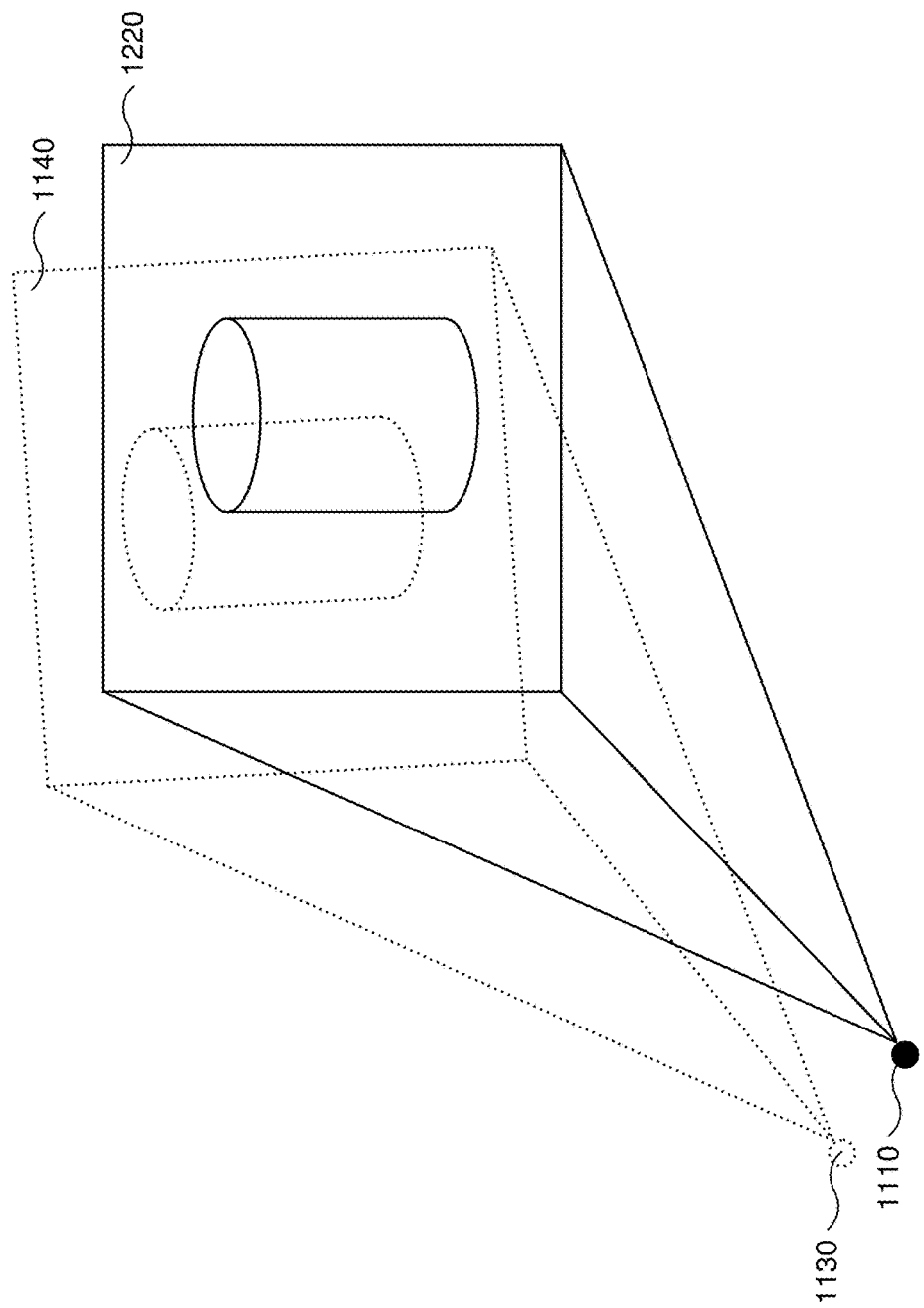

METHODS AND SYSTEMS FOR MULTISTAGE POST-RENDERING IMAGE TRANSFORMATION

BACKGROUND

Even with a graphic processing unit (GPU) that employs specialized hardware for rendering three-dimensional (3-D) scenes, models, and/or objects into two-dimensional (2-D) images, rendering such images generally requires significant computation and time. As a result, an image may be rendered based on parameters calculated before rendering the image that ultimately are inconsistent with actual conditions at a time that the image is displayed. For example, a "best guess" estimate of a user's orientation for a future time that is used to render an image may not match the user's actual orientation at that future time, resulting in a mismatch between the rendered image and conditions when the rendered image is being displayed.

One approach to reducing such mismatches is to perform a post-rendering transformation of a rendered image that is performed in a significantly reduced amount of time relative to the rendering of the rendered image. For example, an initial image may be rendered based on an early estimate of parameters, and a post-rendering transformation of the initial image may be performed based on a new, more accurate, estimate of the parameters performed shortly before the image is displayed. However, conventional approaches have faced tradeoffs between latency and the complexity of image transformations, since more complex image transformations required more time to complete. Also, since an amount of time to perform a post-image transformation may not be known in advance, post-image transformations may be initiated at earlier times to allow for "worst case" scenarios that often do not occur, resulting in missed opportunities to further reduce latency. Conventionally, such issues have been addressed by using simple image transformations, such as affine or projective transformations, to realize low latency post-rendering transformation.

SUMMARY

Systems and methods for multistage post-rendering image transformation. The system may include a transform generation module arranged to dynamically generate an image transformation between positions in a source space and corresponding positions in a destination space. The system may also include a first memory arranged to receive and store transformation data. The system may also include a transform data generation module arranged to receive the image transformation from the transform generation module, generate first transformation data for a first sampling position by applying the image transformation generated by the transform generation module for the first sampling position, generate second transformation data for a second sampling position by applying the image transformation generated by the transform generation module for the second sampling position, and store the first and second transformation data in the first memory. The system may include a first image transformation stage arranged to select the first and second transformation data for a first destination image position, calculate a first estimated source image position for the first destination image position based on the first and second transformation data selected by the first image transformation stage, and generate first data by performing a first operation using the calculated first estimated source image position. The system may also include a second image transformation stage arranged to select the first and second transformation data for the first destination image position, retrieve the selected first and second transformation data from the memory, recalculate the first estimated source image position for the first destination image position based on the first and second transformation data retrieved by the second image transformation stage, and generate first image data for the first destination image position using the recalculated first estimated source image position and the first data generated by the first rendering stage. The system may also include a post-rendering transformation module arranged to receive the first image data and generate a first transformed image based on the first image data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 11 illustrates an example of use of LSR to generate a transformed image for an updated predicted pose from an initial source image data rendered based on an initial predicted pose, as may be performed by the system in FIG. 9 or the HMD in FIG. 10.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
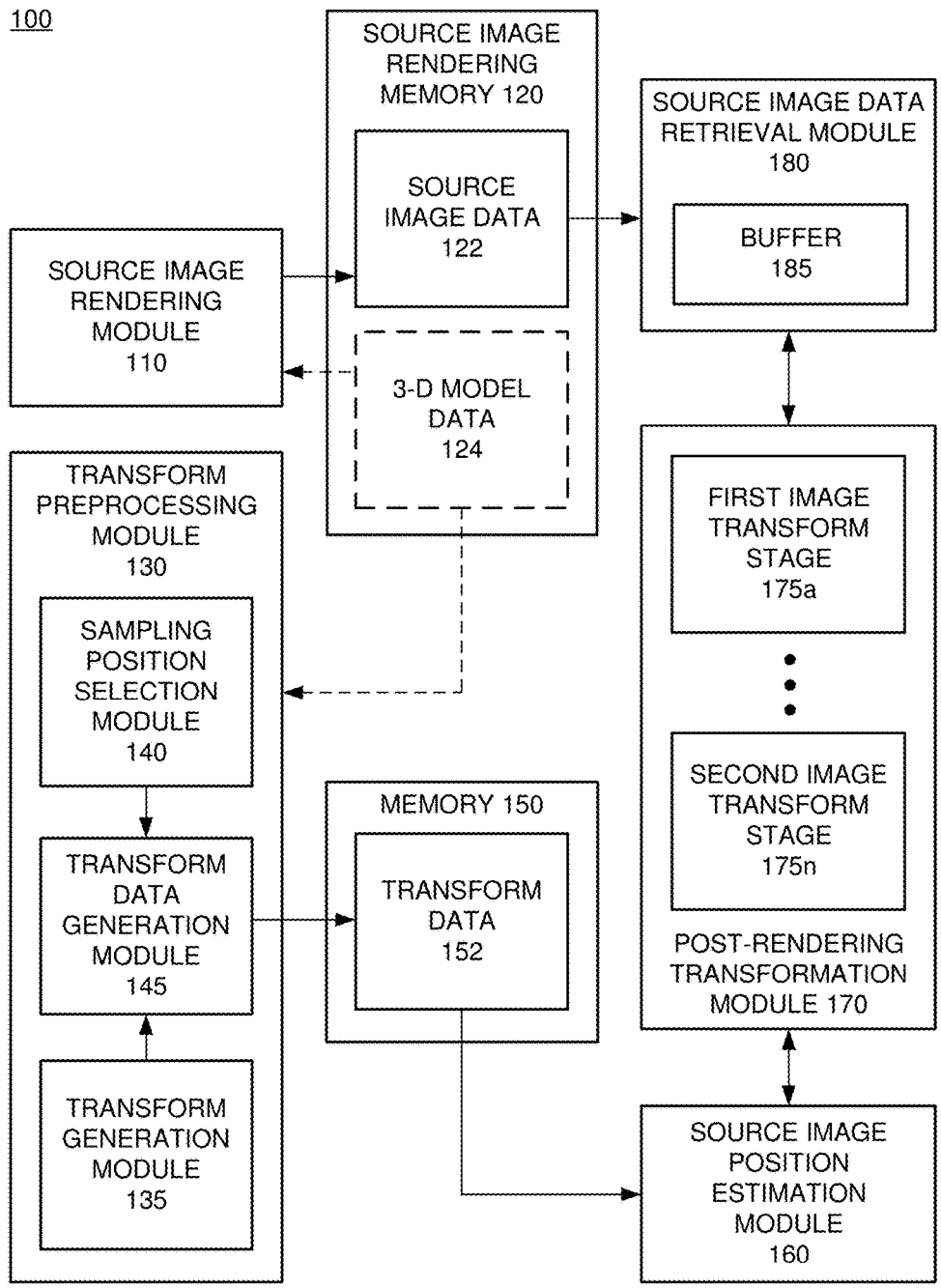
FIG. 1 is a schematic diagram illustrating features included in an example system configured to perform multistage image transformation.

FIG. 1 is a schematic diagram illustrating features included in an example system 100 configured to perform multistage image transformation. It is noted that throughout this disclosure, the noun "transform" may be used as a shorthand term for "transformation." System 100 includes a source image rendering module 110 arranged to render or otherwise generate source image data 122. Source rendering image module 110 may be referred to as a "core renderer," "core rendering pipeline," or a "core rendering module." Source image rendering module 110 includes a GPU or other rendering system arranged to render 3-D model data (which may describe, for example, a scene or object) from a specified viewpoint or pose into a two-dimensional raster source image data 122. Examples of source image data 122 include, but are not limited to, pixel color data (for example, intensity values for red, blue, and/or green channels and/or subpixels), alpha channel data, a Z-buffer or depth buffer, and/or texture data. Source image data 122 may also be referred to as "rendered image data" or "fully rendered image data." Source image rendering module 110 is arranged to store the generated source image data 122 in a source image rendering memory 120, which is discussed in more detail below. Source image data 122 may be stored in source image rendering memory 120 using a compressed encoding format, which may be a lossless compression format or a lossy compression format.

In some implementations or circumstances, source image rendering module 110 may generate multiple source image data items for use in generating a single transformed image. For example, in rendering an object or scene, source image rendering module 110 may generate both first source image data providing pixel color data and second source image data providing depth information. Two such source image data items may be of different pixel dimensions, although they span the same visual region. As another example, source image rendering module 110 may render first 3-D model data (for example, for a first object) as first source image data and render second 3-D model data (for example, for a second object) as second source image data. In some implementations or circumstances, a field of view for the source image data 122 may be larger than a target field of view for a transformed image generated by post-rendering transformation module 170.

By performing complex 3-D rendering with source image rendering module 110 and using the post-rendering transformation module 170 for later transformation, the resources of the source image rendering module 110 may be focused on 3-D rendering activities. This can improve framerate and/or quality of rendered image.

Source image rendering memory 120 is arranged to receive and store source image data 122 generated by source image rendering module 110 and provide requested portions of the stored source image data 122 to source image data retrieval module 180. In some implementations, source image rendering memory 120 is also be arranged to store 3-D model data 124 and provide requested portions of the stored 3-D model data 124 to source image rendering module 110 and/or transform preprocessing module 130. In some implementations, source image rendering memory 120 is included in or otherwise provided by a memory device (not illustrated in FIG. 1) that is used by and shared with other modules or elements included in system 100. In some implementations, source image rendering memory 120 may be included in source image rendering module 110; for example, a dedicated memory for a GPU. Source image rendering memory 120 may be implemented using one or more DRAM devices (such as, but not limited to, DDR2, DDR3, DDR4, DDR5, GDDR5, or GDDR5X SDRAM), or may be implemented using non-DRAM volatile or nonvolatile memory devices (such as, but not limited to, 3D XPoint™, magnetoresistive RAM (MRAM), or resistive RAM (RRAM)). In some implementations, source image rendering memory 120 offers a far larger amount of memory than is generally offered by an on-chip cache, buffer, or other SRAM-implemented memory, although at a cost of higher latency—particularly in implementations in which source image rendering memory 120 is included in a shared memory device subject to contention among various elements of system 100. In a system-on-a-chip (SoC) implementation, a portion of the source image rendering memory 120 may be included in the SoC, such as a portion used to store source image data 122.

Transform preprocessing module 130 is arranged to generate transform data 152 to be used by the post-rendering transformation module 170 to transform the source image data 122 according to a dynamically generated transformation. Transform preprocessing module 130 includes a transform generation module 135 that is arranged to dynamically generate an image transformation based on dynamic information that changes over time and made available after beginning of rendering the source image data 122; for example, sensor derived data reflecting changes in an end user or the end user's environment. In implementations of system 100 arranged to generate transformed images for a succession of image frames (for example, at a video frame rate of 24 or more frames per second), transform generation module 135 may be arranged to dynamically generate a new image transformation for each successive image frame. As illustrated later, in some examples the dynamic information may reflect recent movements by an end user. The generated transform may also be referred to as a "mapping," and application of the generated transform may be referred to as "mapping." In some implementations or circumstances, the generated transformation is a "forward" transformation which transforms or maps pre-transformation positions in a source space (for example, a coordinate system applicable to source image data 122) to corresponding post-transformation positions in a destination space (for example, a coordinate system applicable to a transformed image generated by post-rendering transformation module 170). In some implementations or circumstances, the generated transformation is a "reverse" or "backward" transformation which transforms or maps pre-transformation positions in a destination space to corresponding post-transformation positions in a source space. The generated image transformation is provided to and applied by transform data generation module 145, which will be described below. The term "position" includes, for example, absolute coordinates, relative coordinates, displacement vectors, and/or normalized coordinates or vectors, and positions may be encoded as integer, fixed point, or floating point values.

The dynamic generation of the image transformation may include selecting one or more image transformations to apply based on the dynamic information and/or generating one or more parameters for one or more image transformations based on the dynamic information. The dynamically generated image transformation may include a sequence, concatenation, or other combination of image transformations including one or more dynamically generated transformations, and which may also include one or more predetermined transformations (for example, a fixed optical correction for a fixed focal length lens) or precalculated transformations (for example, a transformation generated based on user-specific, environment-specific, or application-specific parameters that is left unchanged for a period of time). Individual transformations used in a combination of transformations may be referred to as "component transformations" or "constituent transformations." By combining multiple transformations, a more complex transformation can be defined that more accurately realizes a transformation directed to one goal (for example, complex asymmetric optical distortions). By combining multiple transformations, multiple goals can be realized (for example, correction for optical distortion and transformation of source image data 122 to account for an update in an estimated pose of an end user) using respective transformations. Additionally, a transformation conventionally performed by a GPU may instead be incorporated into a combination of transformations dynamically generated by transform generation module 135, thereby relieving the GPU of performing computation for the transformation. In some implementations, multiple transformations may be generated to correct for chromatic aberration; for example, a first transformation combining a first dynamically generated transformation with a red-channel transformation, a second transformation combining the first dynamically generated transformation with a green-channel transformation, and a third transformation combining the first dynamically generated transformation with a blue-channel transformation.

Some examples of individual transformations include two-dimensional geometric image transformations such as, but are not limited to, affine transformations (linear conformal (scaling, translations, rotations) and shears), projective transformations (projections, homographies, and collineations), and piecewise linear transformations (for example, affine transformations applied separately to triangular regions of an image); nonlinear image transformations such as, but not limited to, polynomial transformations, nonuniform scaling, circular or radial distortion (barrel, pincushion, moustache, and multiorder), and tangential distortion (for example, using Brown's model). In some implementations, a transformation may be performed based on a 3-D position corresponding to a sampling position; for example, the 3-D position may be determined based on 3-D model 124 or based depth information included in source image data 122. Such 3-D transformations can yield more accurate transformations for predicted pose changes than 2-D image transformations. Transformations or portions of transformations may be implemented using various techniques, such as, but not limited to, matrix operations, numerical approximation (such as Taylor series or Newton-Raphson), and mapping/interpolation. Some transformations may be more easily calculated by converting or translating positions from one coordinate system to another (for example, between raster, Cartesian, and/or polar coordinates). Many transformations are more simply or efficiently implemented as a forward transformation. Many forward transformations lack a closed form inverse, requiring a corresponding reverse transformation to be calculated by numerical solutions such as Newton-Raphson iteration.

The transform preprocessing module 130 includes a sampling position selection module 140, which is adapted to select a plurality of sparsely distributed sampling positions to which the transformation generated by transform generation module 135 will be applied to generate corresponding transformed positions (where "sparse" generally means that there is more than one pixel (in the source space or destination space for the sampling positions) per sampling position). In some implementations, a predetermined pattern or algorithm is used to select the sampling positions; for example, yielding a uniform distribution of sampling positions. In some implementations, there are approximately 9 or more pixels per sampling position (for example, approximately one sampling position for each 3×3 block of pixels). In some implementations, there are approximately 16 or more pixels per sampling position (for example, approximately one sampling position for each 4×4 block of pixels). In some implementations, there are approximately 64 or more pixels per sampling position (for example, approximately one sampling position for each 8×8 block of pixels). In some implementations, there are approximately 256 or more pixels per sampling position (for example, approximately one sampling position for each 16×16 block of pixels). Non-square rectangular blocks may be used as well. For such blocks of pixels, a sampling position may be selected from a predetermined corner of each block (for example, an upper left hand corner), with additional corners selected for peripheral blocks to obtain sampling positions along the entire periphery. In some implementations, sampling position selection module 140 may be arranged to select a non-uniform distribution of sampling positions; several such implementations are described later. Where a forward transformation is generated by transform generation module 135, the sampling positions are in a source space. Where a reverse transformation is generated by transform generation module 135, the sampling positions are in a destination space.

Transform data generation module 145 is arranged to generate transformation data 152 for the sparsely distributed sampling positions selected by sampling position selection module 140 by applying the transformation generated by transform generation module 135 for each of the sampling positions. Where the transformation being applied is a forward image transformation, the transformation is applied to pre-transformation sampling positions in a source space to generate corresponding post-transformation positions in a destination space. Where the transformation being applied is a reverse image transformation, the transformation is applied to pre-transformation destination positions in a destination space to generate corresponding post-transformation positions in a source space. For purposes of this disclosure, such application of the transformation generated by transform generation module 135 to a sampling position may be referred to as performing an "exact" or "full" transformation of the sampling position, as performing an "exact" or "full" calculation of its transformed position, or as "exactly" or "fully" applying the transformation to the sampling position. It is understood that such use of the term "exact" is not intended to denote that exact values have been calculated; for example, numerical approximation, including iterative methods such as Newton-Raphson, may be used to perform a transformation or a portion of a transformation. In some implementations, sampling position selection module 140 may add additional sampling positions in response to a distance between successive fully transformed positions being greater than or equal to a threshold value and/or a density of fully transformed positions being less than or equal to a threshold value.

The transformation data 152 is generated based on the resulting fully calculated transformed positions, and is encoded in a form effective for calculating an estimated source image position from a supplied destination image position, such as via interpolation based on the transformed positions, to estimate, simulate, or approximate fully applying the transformation without actually fully applying the transformation. For purposes of this disclosure, source image positions calculated based on a destination image position and the transformation data 152 may be referred to as "estimated," "simulated," or "approximated" source image positions. Examples of selecting sampling positions, generating corresponding transformation data, and storing the transformation data are described later in connection with FIGS. 3-7. In some implementations, intermediate transformation data may be generated, and the intermediate transformation data used to generate transformation data for two different sampling positions.

By limiting full application of the transformation generated by transform generation module 135 to only a sparse distribution of sampling positions, a number of positions that are fully transformed (a computationally expensive operation) is substantially reduced. For example, where approximately one sampling position is selected for each 8×8 block of pixels, approximately only 1/64 of the cost for fully transforming all of the pixels is incurred. In some implementations, this may provide additional design latitude to apply more complex transformations.

System 100 includes memory 150, which is arranged to store transform data 152 received from transform data generation module 145, and is further arranged to provide the stored transform data 152 to source image position estimation module 160. In some implementations, memory 150 includes a static RAM (SRAM), flip flops, or other such memory elements (including, for example, a cache memory) used to store and retrieve the transform data 152. In such implementations, memory 150 may be referred to as a "local memory" or a "low-latency memory," and is effective for significantly accelerating generation of estimated source image positions based on the transform data 152 in comparison to storing transform data 152 in a higher latency memory, such as source image rendering memory 120.

Additionally, the use of only a sparse distribution of sampling positions is particularly helpful where a local memory is used to store transform data 152. Such memory is typically in short supply or has limited unused space. By substantially reducing the number of sampling positions, and as a result a resulting size of transform data 152, use of a low-latency memory 150 becomes easier to incorporate into an implementation of system 100. Also, avoiding frequent access to a shared DRAM memory device shared with other elements of system 100 improves DRAM throughput for system 100.

Source image position estimation module 160 is arranged to receive a destination image position (for example, a center position of a raster pixel in destination space for generating a transformed image), select a plurality of portions of the transformation data 152 for the destination image position (for example, based on a proximity of the destination image position to positions associated with the selected portions transformation data 152), and calculate or recalculate a corresponding estimated source image position based on the selected portions of the transform data 152. For example, estimation may be performed by interpolation involving the selected portions of transform data 152. Various interpolation techniques may be employed, including, but not limited to, linear, bilinear, cubic, bicubic, nearest neighbor, natural, and/or spline interpolations. Examples of calculating such estimates are described later in connection with FIGS. 3-6. For purposes of this disclosure, the terms "recalculate" and "recalculating" refer to performing a calculation for destination image position after a previous calculation for the same destination image position (for example, for different modules operating on a same destination image position at different times). In some implementations, source image position estimation module 160 may be included in post-rendering transformation module 170. In some implementations, a table-driven approach for calculating estimated source image positions is used. In some implementations, system 100 may include multiple source image estimation modules, such that each of the stages included in post-rendering transformation module 170 that make use of estimated source image positions includes its own source image position estimation module. In some implementations, source image position estimation module 160 is arranged to use transform data 152 to calculate a plurality of estimated source image positions for a single destination image position, with some or all of the estimated source image positions corresponding to subpixel positions according to a supersampling pattern or kernel useful for antialiasing. For such calculations of multiple estimated source image positions in close proximity to each other, various optimizations, shortcuts, and/or approximations may be leveraged. In some implementations, source image position estimation module 160 is arranged to cache recently calculated estimated source image positions and/or intermediate values used to calculate estimated source image positions, and use such cached information to accelerate calculating other estimated source image positions.

System 100 includes multistage post-rendering transformation module 170, which includes a plurality of image transform stages 175a-175n that each make use of estimated source image positions, including a first image transform stage 175a and a second image transform stage 175n. Although they are referred to as "image transform stages," the term is not intended to imply that each of the plurality of image transform stages 175a-175n performs a transformation operation on an image. Source image data retrieval module 180, which may be included in post-rendering transformation module 170, is arranged to retrieve portions of source image data 122 from source image rendering memory 120 in response to requests for such portions received from post-rendering transformation module 170. In some implementations, source image data retrieval module 180 includes a buffer 185 (for example, an SRAM memory) to store portions of source image data 122 received from source image rendering memory 120.

In some implementations, the first image transform stage 175a may implement a prefetch stage arranged to initiate a prefetch of a portion of source image data 122 corresponding to one or more destination image positions. By initiating a prefetch of that portion of source image data 122, high latency (which may be worse for a shared DRAM memory device) may be "hidden," such that the portion of source image data 122 has been received from source image rendering memory 150 without stalling, or reducing stalling of, a subsequent image transform stage. In an implementation of post-rendering transformation module 170 arranged to perform tile-based processing (rectangular units of pixels), quad-based processing (units of 2×2 pixels), or other processing of pixels in groups, estimated source image positions for all of the pixels in the group (which may include supersampled source image positions used for antialiasing) are calculated for the first image transform stage 175a, and one or more corresponding portions of source image data 122 to be prefetched. By performing an operation including requesting a portion of source image data 122, and subsequent receipt of the requested source image data 122, the first image transform stage 175a generates data used by a subsequent image transform stage.

The plurality of image transform stages 175a-175n may include a secondary information prefetch stage. In much the same manner described for the first image transform stage 175a, the secondary information prefetch stage is arranged to initiate a prefetch of secondary source image data, such as depth or blending information, from source image rendering memory to hide the latency associated with the prefetch being fulfilled. An estimated source image position corresponding to a destination image position is calculated or recalculated for the secondary information prefetch stage using transformation data 152, and is used to identify a corresponding portion of source image data 122 to be prefetched. The plurality of image transform stages 175a-175n may further include a secondary information processing stage arranged to receive prefetched secondary information and process the received secondary information. An estimated source image position corresponding to a destination image position is calculated or recalculated, using transformation data 152, for the secondary information processing stage for identifying appropriate retrieved data for processing.

The plurality of image transform stages 175a-175n may include a decompression stage that receives source image data 122 that has been stored in a compressed format. In some implementations, the decompression stage is arranged to determine a portion of the compressed source image data that should be decompressed based on a recalculated estimated source image position, recalculated using transformation data 152, to obtain a portion of decompressed source image data corresponding to a destination image position. In some implementations, the decompression stage is arranged to decompress an entire chunk of compressed source image data, and to determine a position within the decompressed chunk of source image data based on a recalculated estimated source image position, using transformation data 152, to obtain a portion of decompressed source image data corresponding to a destination image position. Accordingly, the decompression stage generates data used by a subsequent image transform stage.

The second image transform stage 175n is arranged to generate image data for a destination image position (for example, a position corresponding to a pixel of a display device) based on data generated by another one of the image transform stages 175a-175n and a recalculated estimated source image position, recalculated using transformation data 152, corresponding to the destination image position. In some implementations, second image transform stage 175n includes an antialiasing stage. Aliasing artifacts can be severe and noticeable for transformations of raster image data, such as the source image data 122. Additionally, retrieving and handling source image data 122 for estimated source image positions with a fractional component may be simplified by simply retrieving source image data for a nearest neighbor to the estimated source image position, rather than interpolating or blending pixel color data of adjacent pixels. A plurality of estimated source image positions are calculated or recalculated using transform data 152 for a single destination image position for the antialiasing stage, with some or all of the estimated source image positions corresponding to subpixel positions according to a supersampling pattern or kernel useful for antialiasing. Corresponding values from data generated by another one of the image transform stages 175a-175n may be selected based on the plurality of estimated source image positions to generate image data for the destination image position. In some implementations or circumstances, this image data may specify pixel color data for a corresponding raster location in a transformed image.

In antialiasing for conventional post-rendering transformation in which subpixel positions are fully transformed (particularly for reverse transformations, which often do not have closed form implementations), the significant increase in full transformations (for example, 4× or greater supersampling is common) can render antialiasing impractical except for simpler transformations such as affine or projective transformations. However, by use of source image position estimation module 160 in system 100 to calculate estimated source image positions for subpixel positions using transformation data 152, an amount of effort and/or time to calculate a larger number of estimated source image positions is substantially reduced, even for more computationally complex transformations and combinations of multiple transformations.

Use of simple calculations on transform data 152 by source image position estimation module 160 allows the same estimated source image position to be calculated and recalculated each time for the same destination image position. In contrast, with certain approximation techniques used to fully transformation a position, different position values may be calculated for one stage versus another. As a result, system 100 ensures that the same source image data will be used from one stage to another.

In some implementations, memory 150, source image position estimation module 160, post-rendering transformation module 170, and source image data retrieval module 180 are implemented within a single system-on-a-chip (SoC) (not illustrated as such in FIG. 1). In such implementations, transform preprocessing module 130 may also be implemented within the single SoC, and may further include source image rendering module 110 and/or source image rendering memory 120 within the single SoC. In some implementations, the elements illustrated in FIG. 1 may be included in a single electronic or mobile electronic device. In some implementations, the elements illustrated in FIG. 1 may be included in a single head-mounted mobile device.

Figure 2A:
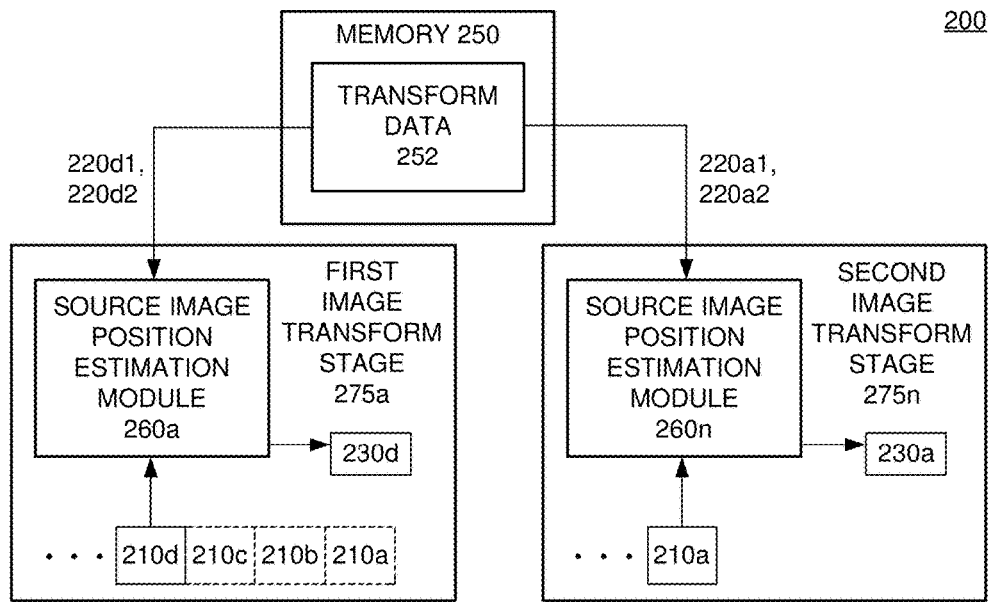
FIGS. 2A and 2B illustrate an example of a calculation of an estimated source image position for a destination image position for a first image transform stage occurring at a time temporally distant from a recalculation of the estimated source image position for the destination image position for a second image transform stage.
Figure 2B:
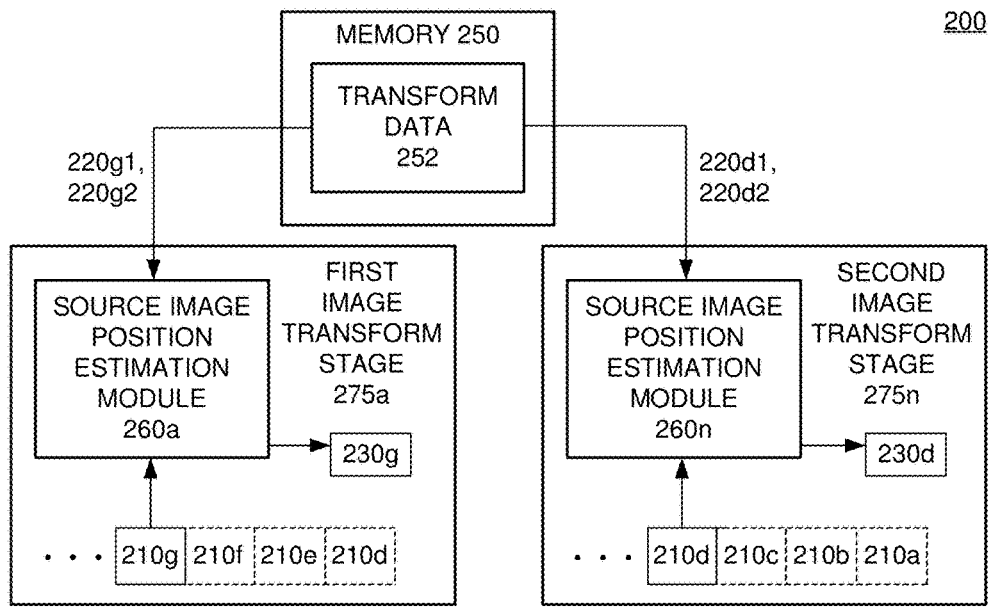

FIGS. 2A and 2B illustrate an example of a calculation of an estimated source image position 230d for a destination image position 210d for a first image transform stage 275a occurring at a time temporally distant from a recalculation of the estimated source image position 230d for the destination image position 210d for a second image transform stage 275*n*. FIGS. 2A and 2B relate to a portion of an example system 200 configured to perform multistage image transformation in much the same manner described for the system 100. System 200 includes a memory 250 that stores transform data 252, much as described in connection with memory 150 and transform data 152 in FIG. 1. System 200 also includes a first image transformation stage 275*a* and a second image transformation stage 275*n*, which are arranged and function much as described in connection with first image transformation stage 175*a* and second image transformation stage 175*n* in FIG. 1. In the example illustrated in FIG. 2, each of first image transformation stage 275*a* and second image transformation stage 275*n* has a respective one of source image position estimation modules 260*a* and 260*n*, which each operate much as described in connection with source image position estimation module 160 in FIG. 1. In some examples, a source image position estimation module may be shared by first image transformation stage 275*a* and second image transformation stage 275*n*, much as in system 100 in FIG. 1. Other features illustrated in FIG. 1, such as the source image rendering memory 120, the source image data retrieval module 180, and the transform preprocessing module 130, have counterparts in system 200, but are not included in the illustration in FIG. 2.

FIG. 2A illustrates operation, at or about a first time, of the portion of the system 200. At or about the first time, the first image transform stage 275*a* seeks to obtain an estimated source image position 230*d* for a destination image position 210*d*. The destination image position 210*d* is provided to the source image position estimation module 260*a* to calculate the estimated source image position 230*d* for the first image transform stage 275*a*. FIG. 1 illustrates previous destination image positions 210*a*, 210*b*, and 210*c* (illustrated in dashed lines), which corresponding estimated source positions were calculated for the first image transform stage 275*a* before the first time during which estimated source image position 230*d* is being calculated. At or about the first time, the source image position estimation module 260*a* selects two (and possibly more) transformation data 220*d*1 and 220*d*2, which are stored in and retrieved from memory 250. Then, based on the retrieved transformation data 220*d*1 and 220*d*2, the source image position estimation module 260*a* calculates the estimated source image position 230*d* for the destination image position 210*d*. The first image transform stage 275*a* generates a first data by performing a first operation using the calculated estimated source image position 230*d*.

At or about the first time, the second image transform stage 275*n* seeks to obtain an estimated source image position 230*a* for a destination image position 210*a* (for which a corresponding estimated source image position 230*a* was previously calculated before the first time, as discussed above). The destination image position 210*a* is provided to the source image position estimation module 260*n* to recalculate the estimated source image position 230*a* the second image transform stage 275*n*. For this, the source image position estimation module 260*n* selects two (and possibly more) transformation data 220*a*1 and 220*a*2, which are stored in and retrieved from memory 250. Then, based on the retrieved transformation data 220*a*1 and 220*a*2, the source image position estimation module 260*n* recalculates the estimated source image position 230*a* for the destination image position 210*a*. The second image transform stage 275*n* generates first image data for the destination image position 210*a* using the recalculated estimated source image position 230*a*.

FIG. 2B illustrates operation, at or about a second time later than and temporally distant from the first time, of the portion of the system 200. In an interval of time between the operations illustrated in FIG. 2A at or about the first time and the operations illustrated in FIG. 2B, estimated source positions were calculated (in sequence) for the first image transform stage 275*a* for destination image positions 210*e* and 210*f* (illustrated with dashed lines), and estimated source positions were recalculated (in sequence) for the second image transform stage 275*n* for destination image positions 210*b* and 210*c* (illustrated with dashed lines). Also in that interval of time, source image position estimation module 260*a* selected and retrieved two or more transformation data from memory 250 for each of the destination image positions 210*e* and 210*f*, and source image position estimation module 260*n* selected and retrieved two or more transformation data from memory 250 for each of the destination image positions 210*b* and 210*c*. The second time in FIG. 2B is temporally distant from the first time in FIG. 2A; for example, in view of the operations performed for other destination image positions during the interval of time. This may also be described as the operations illustrated in FIG. 2A occurring in or during a first time slice, and the operations illustrated in FIG. 2B occurring in or during a second time slice.

The operation of first image transformation stage 275*a* and second image transformation stage 275*n* illustrated in FIG. 2B is much as described for FIG. 2A, but for different destination image positions. At or about the second time, source image position estimation module 260*a* calculates estimated source image position 230*g* for the first image transformation stage 275*a*, selecting and retrieving transform data 220*g*1 and 220*g*2 in the process. At or about the second time, source image position estimation module 260*n* recalculates estimated source image position 230*d* (which was calculated at or about the first time in FIG. 2A) for the second image transformation stage 275*n*, selecting and retrieving transform data 220*d*1 and 220*d*2 in the process (much as transform data 220*d*1 and 220*d*2 were selected and retrieved by source image position estimation module 260*a* in FIG. 2A). The second image transform stage 275*n* generates second image data for the destination image position 210*d* using the recalculated estimated source image position 230*d*. In an example in which a source image position estimation module is shared by first image transformation stage 275*a* and second image transformation stage 275*n*, much as shown in the example illustrated in FIG. 1, the source image position estimation module would calculate the estimated source image position 230*d* for the first image transformation stage 275*a* at a time temporally distant from a later time that the same source image position estimation module would recalculate the estimated source image position 230*d* for the first image transformation stage 275*a* (and also again select, and retrieve, transform data 220*d*1 and 220*d*2 for destination image position 210*d*).

It is noted that operations illustrated in FIG. 2A for the first image transform stage 275*a* and the second image transform stage 275*n* are not necessarily simultaneous or concurrent with each other, but do occur at approximately the same time. For example, the operations illustrated in FIG. 2A for the second image transform stage 275*n* may be initiated after an estimated source image position corresponding to the destination image position 210*c* is calculated for the first image transform stage 275*a*, and completed before the destination image position 210*d* is provided to the source image position estimation module 260*a* to calculate the estimated source image position 230*d* for the first image transform stage 275*a*. Similar considerations apply for FIG. 2B.

Figure 3:
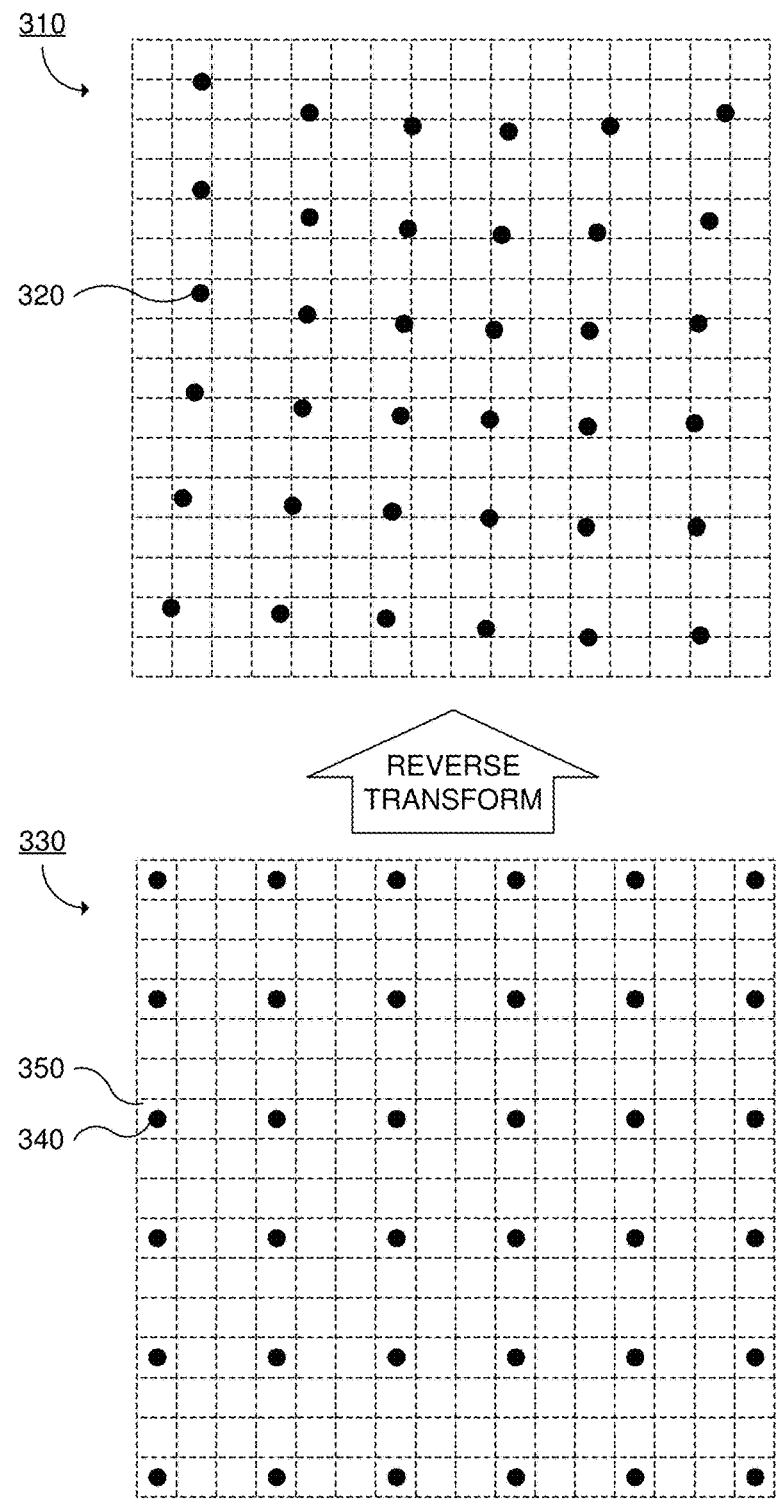
FIG. 3 illustrates an example of reverse transformation or reverse mapping from sampling positions in a destination space to corresponding fully transformed positions in a source space.

FIG. 3 illustrates an example of reverse transformation or reverse mapping from sampling positions in a destination space to corresponding fully transformed positions in a source space. FIG. 3 illustrates a 16×16 pixel portion of a destination space 330. The 36 black circles positioned inside of the illustrated portion of destination space 330 show a plurality of sparsely distributed sampling positions selected by sampling position selection module 140, including a sampling position corresponding to a raster pixel 350. It is noted that a small number of pixels and a small number of sampling positions are shown in FIG. 3, to more clearly illustrate and discuss the subject matter. In FIG. 3, the sampling positions are uniformly distributed, with neighboring columns of sampling positions separated by two empty columns, and neighboring rows separated by two empty rows. In most of the destination space 330, there is one sampling position in one corner (for example, the upper left hand corner) of each 3×3 block of pixels, with an additional 11 sampling positions (for example, along the right and bottom sides of destination space 330, providing sampling positions along the entire periphery of destination space 330. In the example illustrated in FIG. 3, each of the sampling positions is positioned at the center of a pixel (which may correspond to integral position values), although the sampling positions do not have to be centered in pixels.

Much as described above in connection with FIG. 1, for the example illustrated in FIG. 3, transform data generation module 145 applies a dynamically generated reverse transformation, generated by transform generation module 145, to each of the sampling positions to generate respective fully transformed source image positions, including, for example, fully transformed source image position 320 corresponding to sampling position 340. The resulting transformed positions are shown as 36 black circles positioned in a 16×16 pixel portion of a source space 310. Although the same number of pixels is illustrated for source space 310 and destination space 330, there may be different numbers of pixels. As illustrated in FIG. 3, although the sampling positions are positioned at the centers of respective pixels, the resulting transformed positions may be located at intermediate positions between pixel centers. Values for such transformed positions may include a fractional component.

Transform generation module 145 generates transformation data 152 based on the resulting transformed positions. There are many approaches for encoding the transformation data 152 for storage in memory 150. The goal is to provide transformation data 152 suitable for source image position estimate module 160 to calculate estimated source image positions corresponding to destination image positions. In some implementations, floating point arithmetic may be used to apply the transformation to the sampling positions and to perform further processing of the resulting fully transformed source image positions to generate transformation data 152, but values stored in memory 150 may be encoded as integers and/or fixed point values to reduce a size of the transformation data 152 and to provide values in a format suitable for subsequent use by source image position estimation module 160. In some implementations, an absolute coordinate may be encoded for each of the transformed positions. In some implementations, a displacement vector or relative position, indicating a difference between a coordinate value for a sampling position and a coordinate position for its corresponding fully transformed position. Such displacements may be small for some or all of the sampling positions, and as a result encoded more compactly than absolute coordinate values.

In some implementations, preprocessed values, generated based on the transformed positions, that facilitate more efficient calculation or estimated source image positions by source image position estimation module 160, may be included in the transformation data 152 instead of the above mentioned absolute or relative positions. For example, values may be prescaled or coefficients generated so as to avoid performing one or more arithmetic operations in the calculations performed by source image position estimation module 160. In circumstances where the sampling positions are uniformly distributed, specific optimizations or preprocessing may be used.

Transformation data 152 is not necessarily limited to values used to calculate estimated source image positions for destination image positions. For example, information may be included that characterizes particular sampling positions, transformed positions, or areas between sampling positions. For example, based on a distance determined for a position and/or an amount of distortion caused by applying a transformation, hints may be provided to allow source image position estimation module 160 and/or post-rendering transformation module 170 adaptively select interpolation, supersampling, and/or sharpening techniques and/or parameters. In some implementations, one or more lookup tables are generated to more quickly perform interpolations.

In an implementation or circumstances in which the sampling positions are arranged in rectangular patterns (although not necessarily in a square grid or a uniform grid), source image position estimation module 160 may calculate estimated source image positions using transformation data 152 by computationally simple closed form bilinear interpolation to map a destination image position within a rectangular domain defined by four sampling positions surrounding a destination image position to a quadratic domain defined by values included in the transformation data 152 corresponding to those four sampling positions. For a destination image position on a row or column directly between two sampling positions, even simpler linear interpolation may be used. For a destination image position at a sampling position, no interpolation at all may be required.

Figure 4:
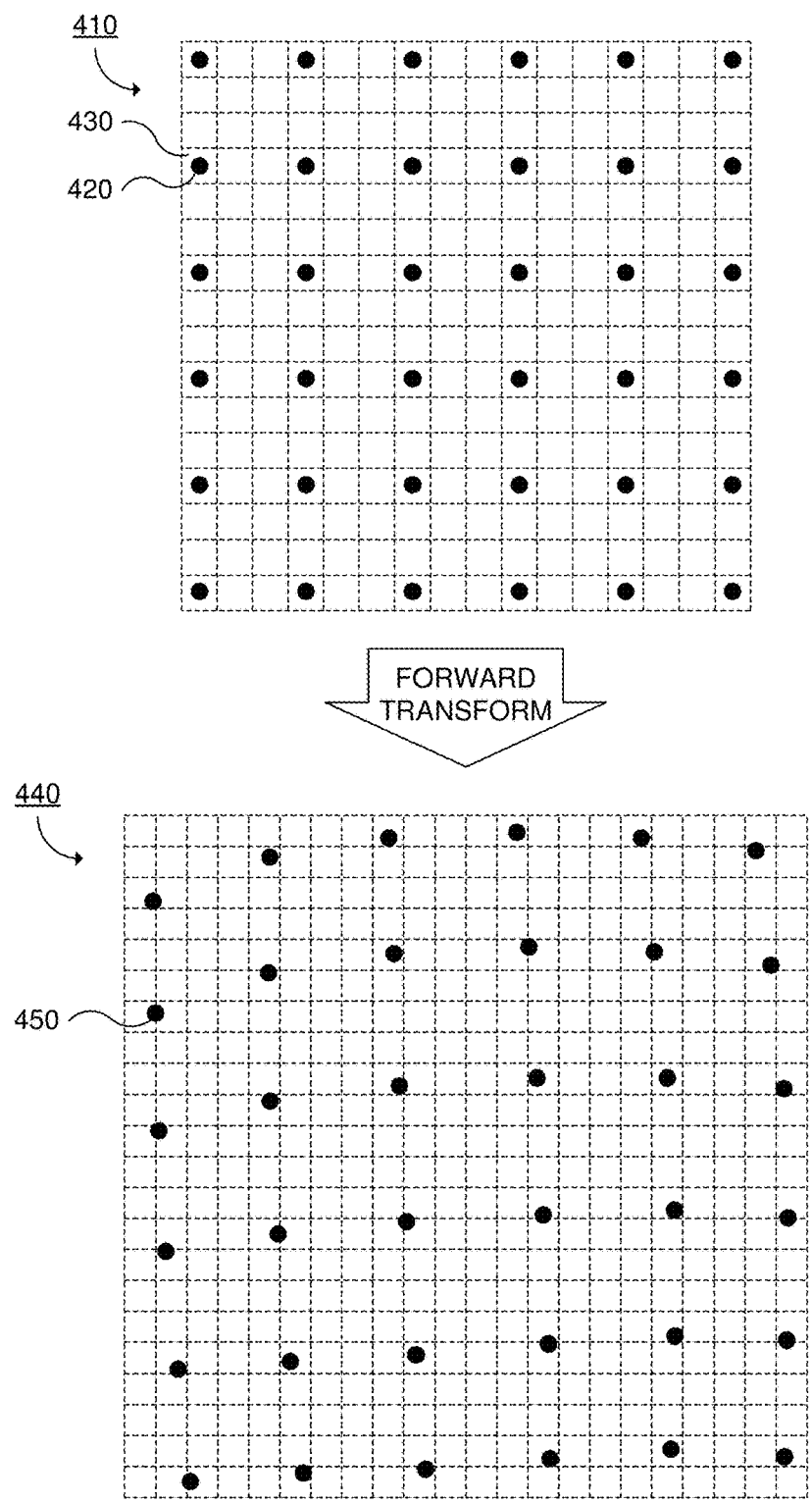
FIG. 4 illustrates an example of forward transformation or forward mapping from sampling positions in a source space to corresponding fully transformed positions in a destination space.

FIG. 4 illustrates an example of forward transformation or forward mapping from sampling positions in a source space to corresponding fully transformed positions in a destination space. As previously noted, many transformations do not have an inverse with a closed form solution. Thus, use of a forward transformation may be more efficient in some implementations or circumstances. In the example illustrated in FIG. 4, 36 sparsely distributed sampling positions have the same positions in the illustrated 16×16 pixel portion of a source space 410 as the sampling positions shown in destination space 330 in FIG. 3.

Much as described above in connection with FIG. 1, for the example illustrated in FIG. 4, transform data generation module 145 applies a dynamically generated forward transformation, generated by transform generation module 145, to each of the sampling positions to generate respective fully transformed destination image positions, including, for example, fully transformed destination image position 450 corresponding to sampling position 420 in raster pixel location 430. The resulting transformed positions are shown as 36 black circles positioned in a 22×22 pixel portion of a destination space 440. In contrast to the regular arrangement of source image positions is destination space 330 illustrated in FIG. 3, the forward transformation results in an irregular arrangement of fully transformed positions in the destination space that makes calculating estimated source image positions using transformation data 152 more difficult.

Figure 5A:
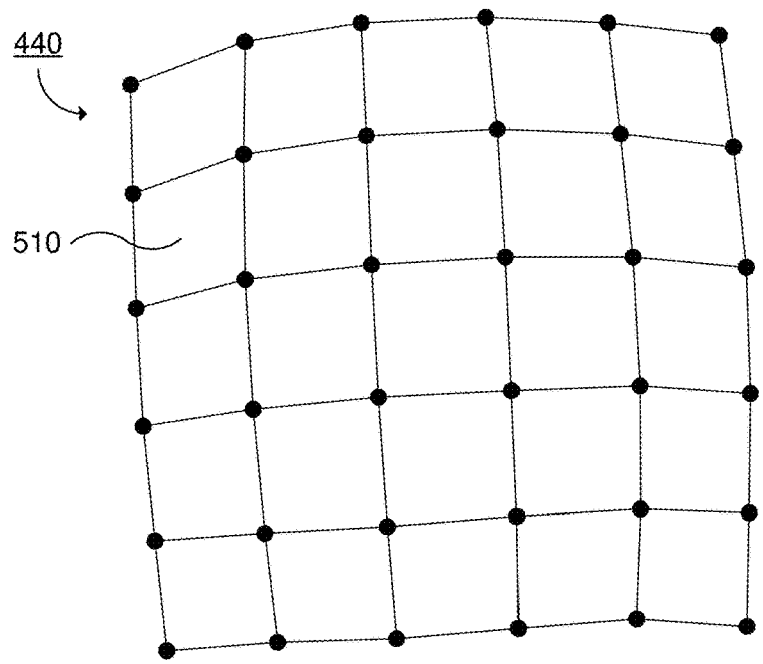
FIG. 5A illustrates an example in which a portion of a destination space has been divided into a plurality of quadrilaterals for calculating estimated source image positions for positions in the destination space using stored transformation data.

FIG. 5A illustrates an example in which a portion of a destination space 510 has been divided into a plurality of quadrilaterals for calculating estimated source image positions for positions in the destination space 510 using stored transformation data 152. In this example, the fully transformed positions in destination space 440 are used as the vertices or corners of the plurality of quadrilaterals. For example, fully transformed position 450 is one of the vertices or corners of quadrilateral 510. In some implementations, source image position estimation module 160 is arranged to determine in which quadrilateral a destination image position is located to select portions of transform data 152 (for example, portions of transform data 152 corresponding to the vertices of the quadrilateral), and to interpolate an estimated source image position using the selected portions of transform data 152. However, even with the appropriate quadrilateral identified, there is not a closed form approach for interpolating from arbitrary quadrilaterals in FIG. 5A to the uniformly distributed sampling positions in source space 410 or other arbitrary quadrilaterals (as may occur where the sampling positions in the source space are not evenly distributed). Newton-Raphson iteration may be used, but is computationally expensive.

Figure 5B:
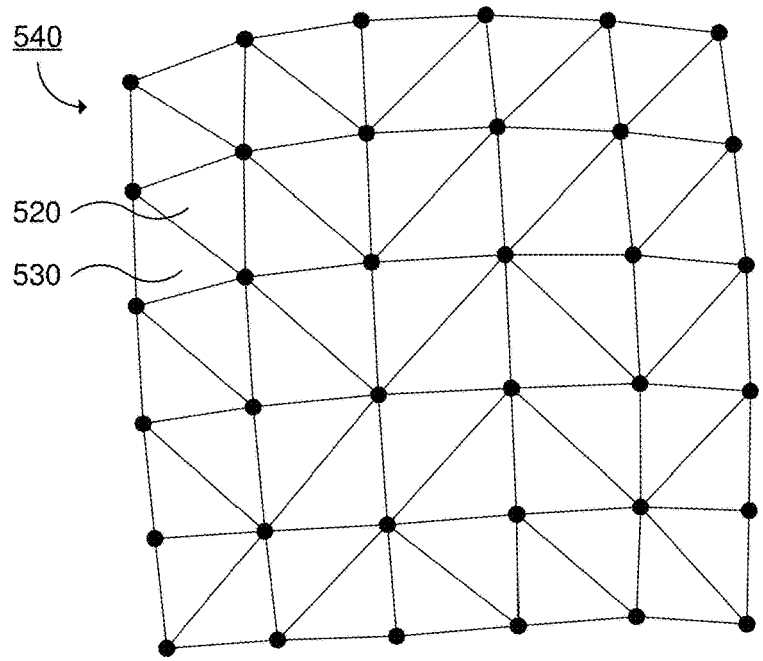
FIG. 5B illustrates an example in which a portion of a destination space has been divided into a plurality of triangles for calculating estimated source image positions for positions in the destination space using stored transformation data.

FIG. 5B illustrates an example in which a portion of a destination space 530 has been divided into a plurality of triangles for calculating estimated source image positions for positions in the destination space 510 using stored transformation data 152. In this example, the fully transformed positions in destination space 440 are used as the vertices or corners of the plurality of triangles. For example, fully transformed position 450 is included as a vertex or corner of triangles 520 and 530. Triangulation of the fully transformed positions may be performed using Delaunay triangulation, although other techniques may be used. In some implementations, source image position estimation module 160 is arranged to determine in which triangle a destination image position is located to select portions of transform data 152 (for example, portions of transform data 152 corresponding to the vertices of the triangle, or a portion of transform data 152 corresponding to the triangle), and to interpolate an estimated source image position using the selected portions of transform data 152. Barycentric interpolation may be used for calculating the estimated source image position. Intermediate values used for barycentric interpolation (for example, certain vector cross product values) may be precomputed and included in transform data 152.

Figure 6A:
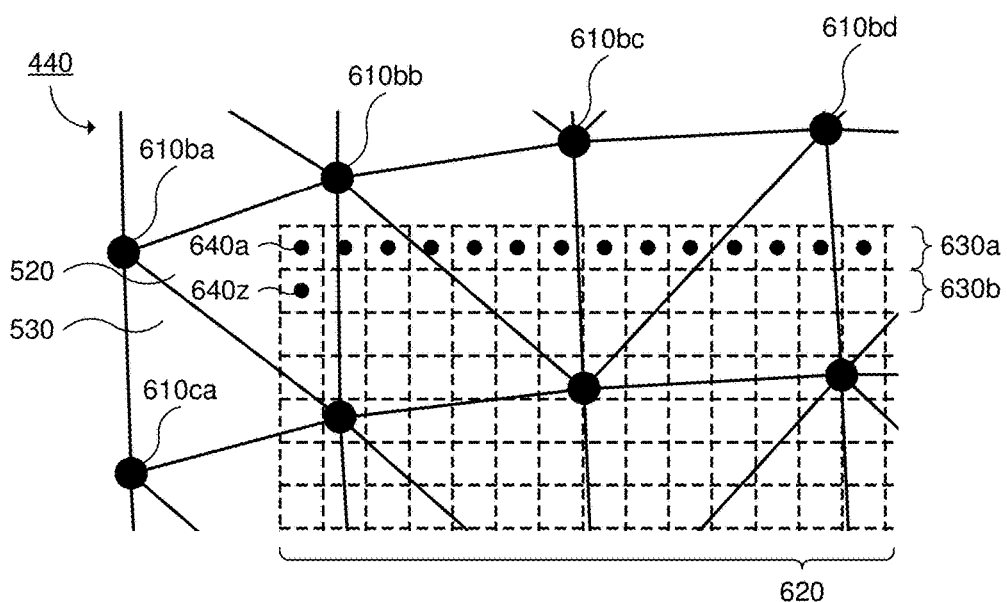
FIGS. 6A and 6B illustrate examples of calculating estimated source image positions, using stored transformation data, for generating a transformed output image.
Figure 6B:
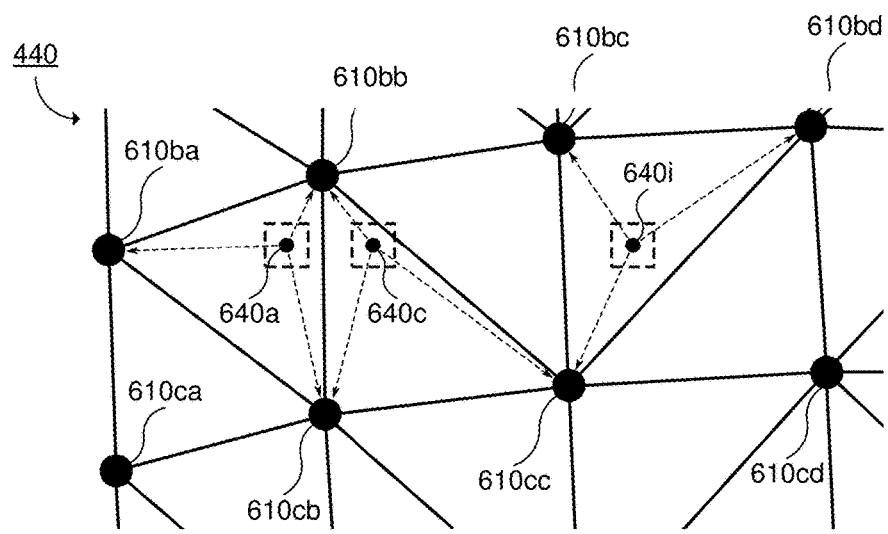

FIGS. 6A and 6B illustrate examples of calculating estimated source image positions, using stored transformation data, for generating a transformed output image. In these examples, a portion of the fully transformed positions in the destination space 440 and the triangulation illustrated in FIG. 5B is used, including fully transformed positions 610*ba*, 610*bb*, 610*bc*, 610*bd*, 610*ca*, 610*cb*, 610*cc*, and 610*cd*, and triangles defined thereby, including triangles 520 and 530. FIG. 6A illustrates generating a portion of a transformed image 620 by identifying destination image positions corresponding to raster pixels included in the transformed image 620. In the example illustrated in FIG. 6A, raster pixels for transformed image 620 are generated row by row; for example, beginning with processing a first pixel row 630*a* and then processing a second raster pixel row 630*b* below the first raster pixel row 630*a*. For a first raster pixel on a left end of the first raster pixel row 630, a destination image position is identified; for example, at a center position of the raster pixel.

To estimate a corresponding source image position, the source image position estimation module 160 determines in which of the triangles a current destination image position is located. To identify a triangle in which the current destination image position is located, source image position estimation module 160 may determine if a triangle in which a recently processed destination image position was included also includes the current destination image position. If not, a similar determination may be performed for neighboring triangles. Also, when calculating an estimated source image position for a first pixel in a row of pixels (for example, for the destination image position 640*z* at the beginning of pixel row 630*b*) using stored transformation data 152, a similar determination may be made whether a current destination image position is located within a triangle in which destination image position 640*a* is located. Then, a barycentric interpolation is performed based on the positions of the vertices of the triangle relative to the current destination image position and the sampling positions corresponding to the vertices of the triangle. A resulting estimated source image position is used by post-rendering transformation module 170 to generate image data for generating the transformed image 620.

FIG. 6B illustrates an example handling for specific raster pixels. Destination image position 640*a* is determined to be within triangle 520. As a result, source image position estimation module 160 performs a Barycentric interpolation based on transformation data 152 stored in memory 150 that is associated with vertices 610*ba*, 610*bb*, and 610*cb* of the triangle 520. Likewise, for destination image position 640*c*, source image position estimation module 160 performs a Barycentric interpolation based on transformation data 152 stored in memory 150 for a neighboring triangle defined by vertices 610*bb*, 610*cb*, and 610*cc*. Also, for destination image position 640*i*, source image position estimation module 160 performs a Barycentric interpolation based on transformation data 152 stored in memory 150 for a neighboring triangle defined by vertices 610*bc*, 610*bd*, and 610*cc*.

Figure 7:
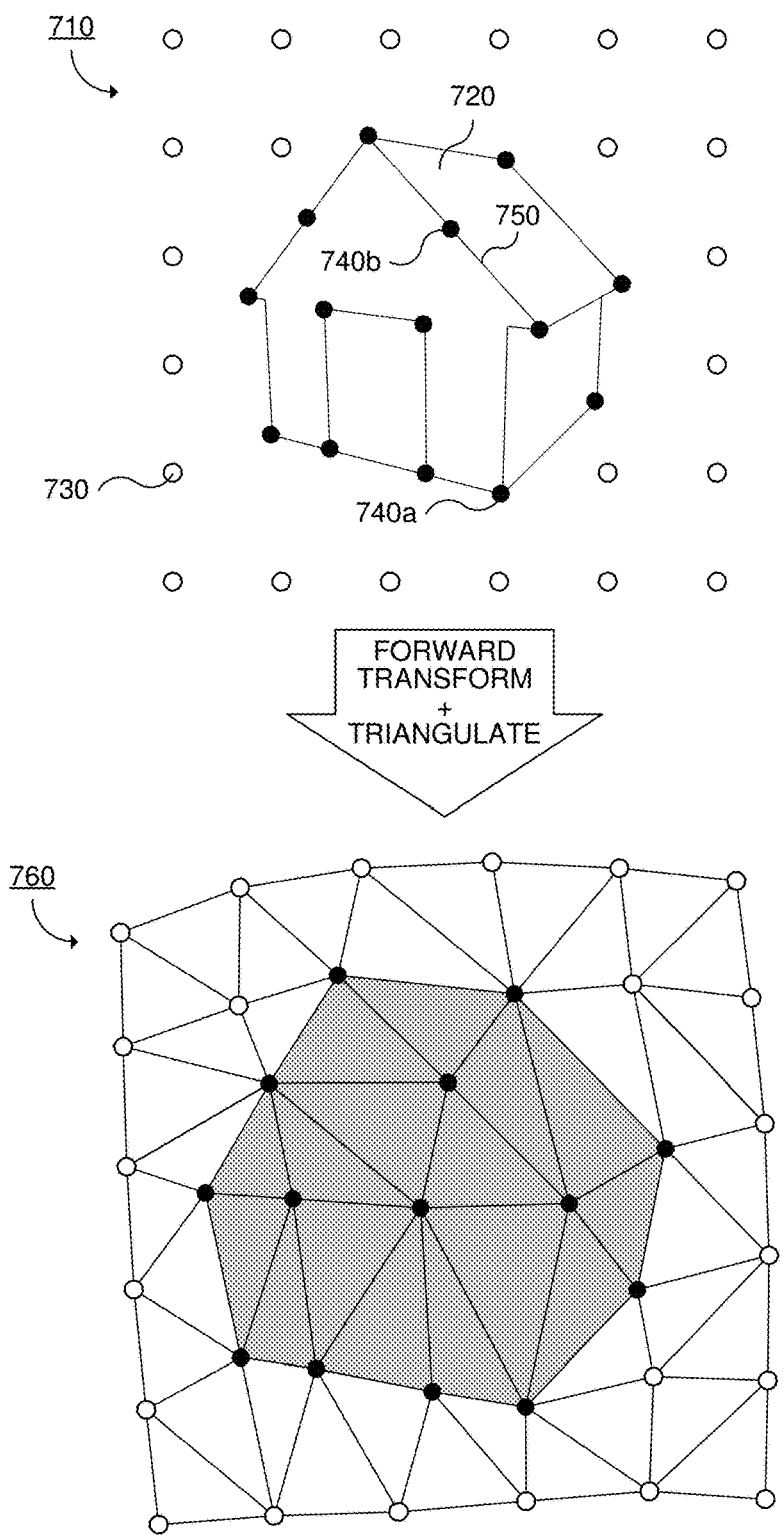
FIG. 7 illustrates an example of an implementation of the sampling position selection module that is arranged to select sampling positions in a source space based on features of a 3-D model used to render a source image data that is to be transformed.

FIG. 7 illustrates an example of an implementation of the sampling position selection module 140 that is arranged to select sampling positions in a source space based on features of a 3-D model used to render a source image data that is to be transformed. In some implementations, source image rendering module 110 is configured to identify vertices or edges of interest in 3-D model 124 used to render source image data 122, and may also determine and identify positions in source space corresponding to the identified vertices or edges. Sampling position selection module 140 may be arranged to receive information identifying such source image positions from source image rendering module 110, such as via source image rendering memory 120.

FIG. 7 illustrates a portion of a source space 710 in which an object 720 included in 3-D model data 124 has been rendered. The 14 black circles show sampling positions that were selected based on features specified by the 3-D model data 124. For example, a sampling position 740*a* was selected based on it corresponding to a position in source image data 122 at which a corresponding vertex was rendered. Further, an additional sampling position 740*b* was selected along edge 750 specified by the 3-D model data 124. In some implementations, sampling position selection module 140 is arranged to select a greater density of sampling positions along one or more selected edges to ensure a more accurate transformation of the source image data 122 along or around the selected edges. In some implementations, sampling position selection module 140 is arranged to select sampling positions that correspond to a boundary or outline of a rendered object or model. The remaining 23 white circles show sampling positions, including a sampling position 730, that were selected by position selection module 140 much as described for source space 410 in FIG. 4.

Much as described in connection with FIGS. 2 and 4, transform data generation module 145 applies a forward transformation to the sampling positions in the source space 710, thereby generating corresponding fully transformed positions in a destination space 760. Additionally, a triangulation has been performed, much as described in connection with FIG. 5B. The shaded triangles correspond to portions of the transformed image in which object 720 will be displayed. By selecting sampling positions based on the 3-D model data 124 for the object 720, undesirable distortions in displaying the object 720 may be reduced while continuing to use only a sparse distribution of sampling positions.

Figure 8:
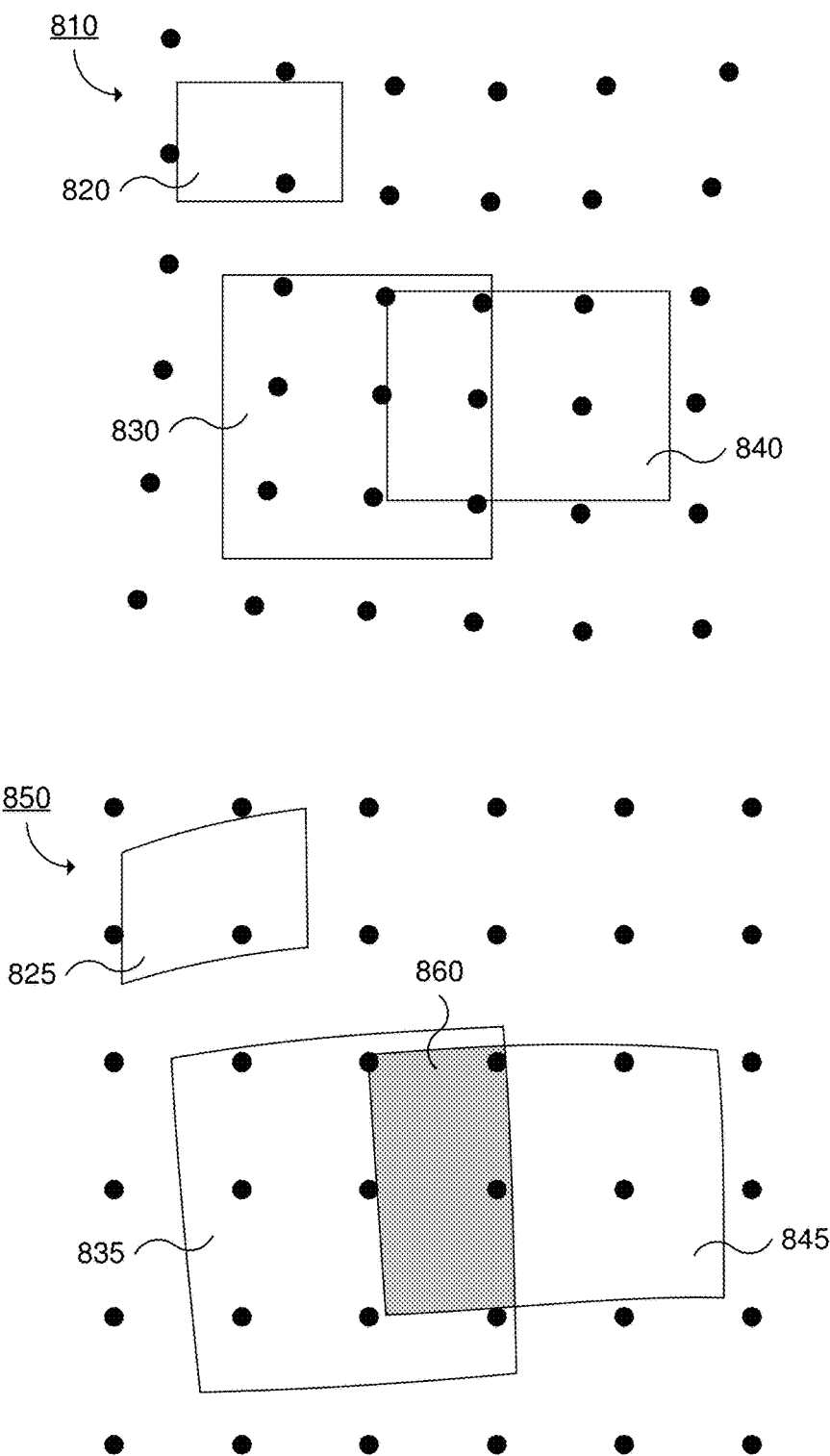
FIG. 8 illustrates an example in which transform data generated as described herein is used for transforming concurrently displayed source image data.

FIG. 8 illustrates an example in which transform data generated as described herein is used for transforming concurrently displayed source image data. In this example, a reverse transformation has been applied to sampling positions shown in destination space 850 to generate fully transformed positions in a source image space. Three rendered images 820, 830, and 840 have been, or are to be, rendered and corresponding source image data for each of the three rendered images 820, 830, and 840 stored in source image data memory 120. The rendered image 820 does not overlap either of the rendered images 830 and 840 in destination space 850 (as illustrated by transformed images 825, 835, and 845). The images 830 and 840 overlap in destination space 850 in an overlap region 860. For a pixel in overlap region 860, a first pixel color value for transformed image 835 may be generated, a second pixel color value for transformed image 845 may be generated, and a final pixel color value determined based on the first and second pixel color values (for example, by a compositing operation).

Figure 9:
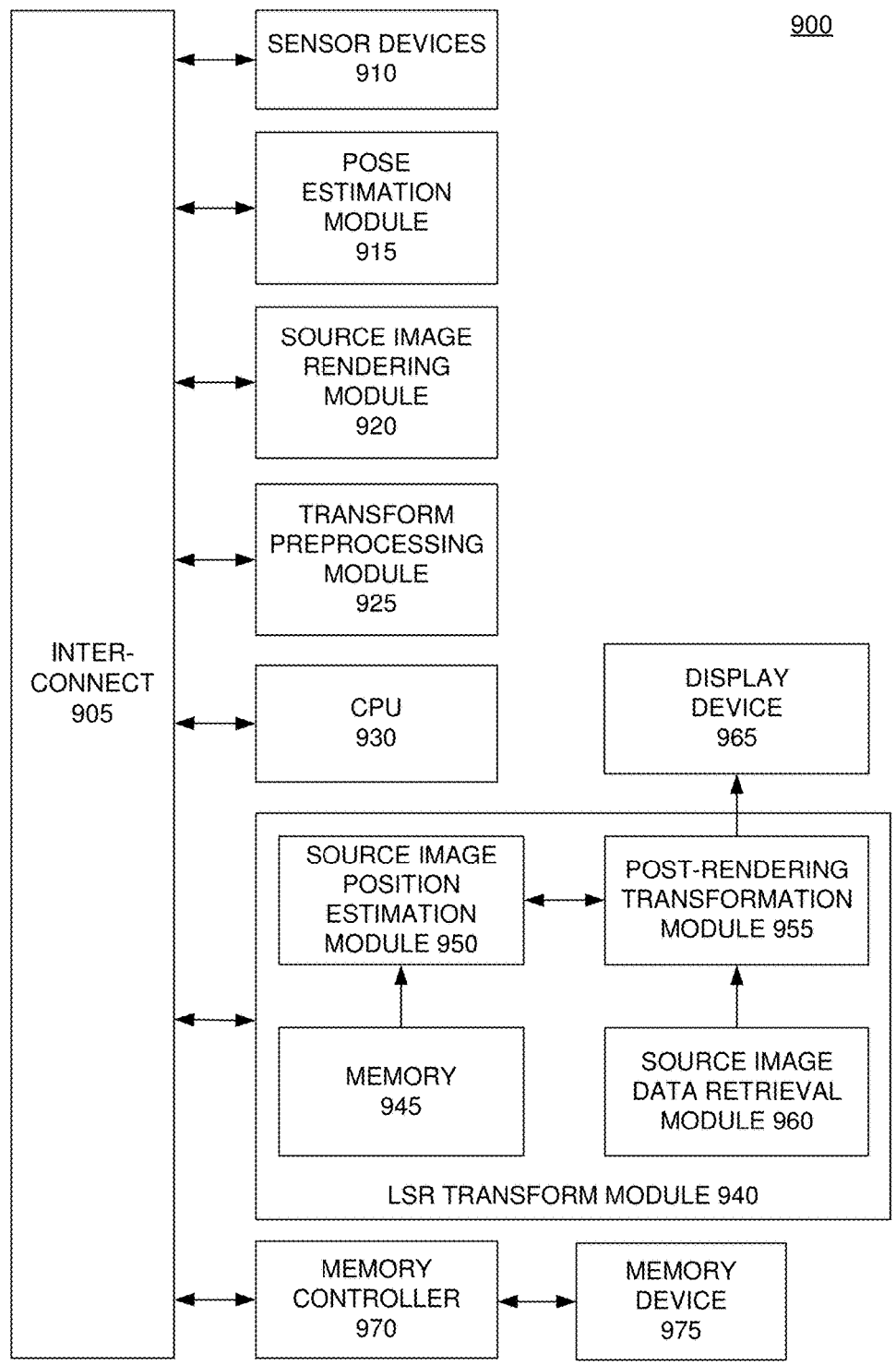
FIG. 9 is a schematic diagram illustrating features included in an example system arranged to reduce processing used for real-time late stage reprojection (LSR) of an initial rendered image for display via a display device.

FIG. 9 is a schematic diagram illustrating features included in an example system 900 arranged to reduce processing used for real-time late stage reprojection (LSR) of an initial rendered image for display via a display device 965. LSR is particularly useful for immersive and/or interactive display technologies. For example, with a virtual reality (VR), augmented reality (AR), or mixed reality (MR) system using a head-mounted display device (HMD) worn by an end user, most end users are sensitive to, and some users are hypersensitive to, even low amounts of latency between user movements (for example, head movements) and images displayed on the HMD. Additionally, in an AR performing pass-through display of environmental images captured by a camera or an MR system using an optical see-through display (including, but not limited to, an optical see-through HMD worn by an end user) that allows direct viewing of a real-world environment (for example, via transparent lenses or a transparent panel) and projects images of a virtual object into the visual field of the end user thereby augmenting the real-world environment perceived by the end user with the virtual object, LSR improves an end user experience by reducing latency and associated misregistration between a displayed virtual object and the real-world environment. In addition to systems using HMDs, there are other immersive display techniques and applications (for example, a video game console that generates and displays images based on predicted poses for an end user based on sensors not located on an end user's body) for which LSR provides an improved user experience. LSR also provides an approach to generating images with low latency with respect to input on mobile devices and/or in low power applications, as it allows a complex three-dimensional model to be rendered at a low frame rate and one or more reprojections of the rendering of the model based on more recently predicted poses without another full rerendering of the model. Examples of LSR are described in U.S. Pat. No. 9,514,571, entitled "Late Stage Reprojection" and issued on Dec. 6, 2016, which is incorporated by reference herein in its entirety.

The system 900 includes an interconnect 905 that includes circuitry arranged to convey data and/or signals between and/or among various elements of the system 900, including, for example, sensors 910, pose estimation module 915, source image rendering module 920, transform preprocessing module 925, CPU 930, LSR transform module 940, memory controller 970, and/or memory device 975. Interconnect 120 may include topologies such as, but not limited to, buses, rings, meshes, point-to-point, or network-on-chip (NoC). Although FIG. 9 illustrates a single interconnect 905, some implementations include multiple such interconnects providing communication between various elements of system 900. For example, various serial bus protocols, such as but not limited to I$^2$C (Inter-Integrated Circuit), SMBus (System Management Bus), and/or 1-Wire, may be used between pose estimation module 915 and one or more of sensors 910.

System 900 includes sensors 910 arranged to collect and provide sensor data such as, but not limited to orientation data (for example, via one or more gyroscopes), movement data (for example, via one or more accelerometers), position data (for example, via a global positioning satellite signal receiver and/or beacon receivers), image data (for example, via one or more cameras), environment depth data (for example, via one or more depth cameras and/or ultrasonic ranging devices), audio data (for example, via one or more microphones and related audio signal input devices), and/or eye-tracking data (for example, via an infrared eye tracking camera). For an HMD-based implementation, most or all of the sensors 910 (or at least sensors 910 providing sensor data used by pose estimation module 915) may be included in or on the HMD. Pose estimation module 915 is arranged to, based on sensor data collected over time from sensors 910, generate a predicted pose for a selected time in the near future for an end user of system 900 based on sensor data collected by sensors 910. Pose estimation module 915 may receive preprocessed sensor data from other elements included in system 900; for example, filtering, integration, and/or correlation of raw sensor data may be performed to generate such preprocessed sensor data. A predicted pose may indicate, for example, a position, an orientation (for example, a gaze direction), and movement information (for example, movement information effective for applying motion blur).

Except where conflicting with the below discussion, the descriptions in FIGS. 1-8 of various implementations and implementations of source image rendering module 110, transform preprocessing module 130, memory 150, source image position estimation module 160, post-rendering transformation module 170, and source image data retrieval module 180 apply to their counterparts source image rendering module 920 (with source image rendering module arranged to render source image data based on predicted pose information and store rendered source image data in memory device 975), transform preprocessing module 925, memory 945, source image position estimation module 950, post-rendering transformation module 955, and source image data retrieval module 960 (with source image data retrieval module 960 arranged to retrieve source image data stored in memory device 975).

System 900 includes CPU 930, which is configured to execute program instructions causing CPU 930 to configure, coordinate, and/or control operation of other elements included in system 900. CPU 930 may be referred to as a "processor" or "processing unit." In some implementations, some or all of the functions of pose estimation module 915 and transform preprocessing module 925 may be implemented in part by CPU 930. System 900 includes one or more machine readable media including instructions and/or data therein which, when processed and/or executed by elements of system 900, cause those elements and/or system 900 to perform various techniques described herein; for example, CPU 930 may execute according to instructions stored in a nonvolatile storage device (not illustrated in FIG. 9). CPU 930 may include one or more processing cores adapted to execute respective instruction streams. CPU 930 may execute program instructions to perform other functions, such as, but not limited to, operating system functions and/or application programs. System 900 may additionally include other control circuitry (not illustrated in FIG. 9) which is arranged to coordinate and control operations of various elements included in system 900.

System 900 includes LSR transform module 940, which includes memory 945, source image position estimation module 950, post-rendering transformation module 955, and source image data retrieval module 960. In some implementations, some or all of transform preprocessing module 925 is included in LSR transform module 940. In the particular example illustrated in FIG. 9, LSR transform module 940 further includes circuitry arranged to provide pixel data to display device 965. For example, a transformed image generated by post-rendering transformation module 955 may be provided as pixel data to display device 965. LSR transform module 940 or display device 965 may include a display controller (not illustrated in FIG. 9) arranged to perform signaling used to physically display the pixel data. In some implementations, display device 965 includes an optical see-through display through with a user may concurrently view the real-world environment and physically displayed pixel data.

In some implementations, LSR transform module 940 is implemented within a single SoC (not illustrated as such in FIG. 9). In such implementations, pose estimation module 915, transform preprocessing module 925, CPU 930, and memory controller 970 may also be implemented within the single SoC, and may further include source image rendering module 920 and/or memory device 975 within the single SoC. In some implementations, the elements illustrated in FIG. 9, with or without display device 965, may be included in a single electronic or mobile electronic device. In some implementations, the elements illustrated in FIG. 11 may be included in a single head-mounted mobile device.

In some implementations, system 900 includes a memory controller 970 arranged to control and/or schedule accesses to memory device 975 requested by various elements of system 900, thereby allowing those elements to share use of memory device 975. Additional memory devices (not illustrated in FIG. 9), such as, but not limited to, flash memory or other nonvolatile memory devices, may also be accessed and shared via memory controller 970. Memory controller 970 includes circuitry specific to interoperating with the memory device 975 to allow various elements of system 900 to store and/or retrieve data stored in memory device 975 at selected or specified addresses. Examples of memory controllers are described in U.S. Patent Application Publication No. 2015/0293709, entitled "Fine-Grained Bandwidth Provisioning in a Memory Controller" and published on Oct. 15, 2015, which is incorporated by reference herein in its entirety. In some implementations, the memory controller 970 may be incorporated into the interconnect 905.

Memory device 975 is arranged to receive and store data responsive to received memory write commands and corresponding write data. Memory device 975 is further arranged to receive memory read commands, for example, a memory read command specifying an address and an optional length and output corresponding data stored in the memory device 975. System 900 is arranged to use a portion of memory device 975 much as described in connection with source image rendering memory 120 in FIG. 1, such as for storing source image data and/or 3-D model data. In some implementations, CPU 930 executes instructions which generate such 3-D model data, which CPU 930 may store in memory device 975 and/or provide directly to source image rendering module 920.

The arrangement and interconnections among elements illustrated in FIG. 9 is merely illustrated as an example. It is understood that this disclosure also relates to other arrangements and interconnections among such elements that may be used to similar effect. Further details, implementations, and various implementations of system 900 are described below in connection with FIGS. 10-12.

Figure 10:
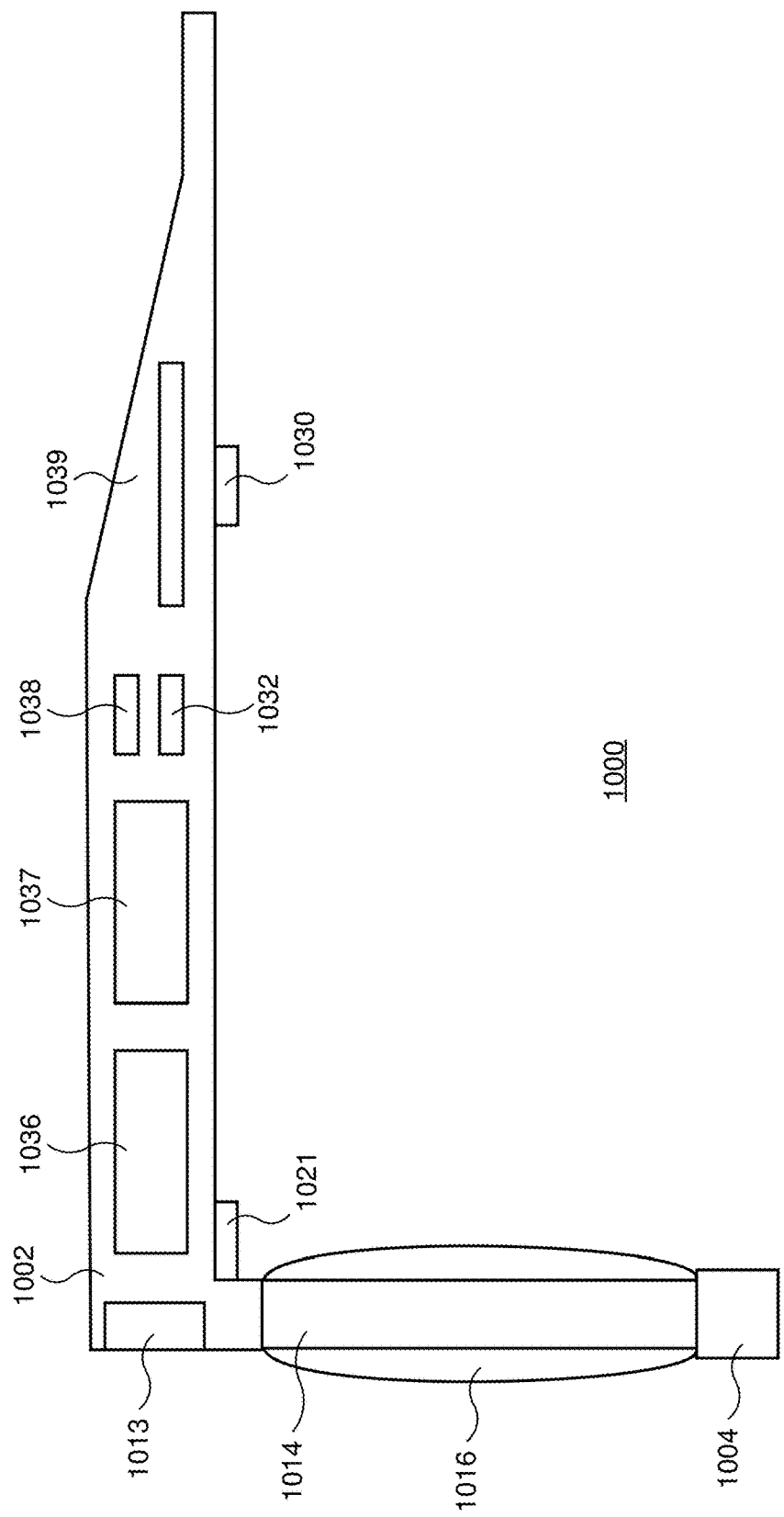
FIG. 10 illustrates a portion of an example head-mounted display (HMD) including the elements illustrated in FIG. 9.

FIG. 10 illustrates a portion of an example HMD 1000 including the elements illustrated in FIG. 9. Only the right side of the HMD 1000 is depicted. Although FIG. 9 illustrates various elements as being disposed on or included in the right side of the HMD 1000, they may be located elsewhere on or in HMD 1000. HMD 1000 includes, among other things, right temple 1002, nose bridge 1004, eye glass 1016, eye glass frame 1014, ear phones 1030, wireless communication module 1037, and power supply 1039. The ear phones 1030 may be used to output sounds associated with the projected images of virtual objects. HMD 1000 also includes a CPU 1036, which is configured much as described for CPU 930 in FIG. 9.

HMD 1000 includes multiple sensors, which may be referred to as "head-mounted sensors," which may be used for determining a predicted pose for an end user wearing HMD 1000. Right temple 1002 includes one or more forward-facing sensors 1013 (for example, one or more imaging cameras, one or more microphones, and/or one or more depth sensors), some of which may be employed as described for sensors 910 in FIG. 9 to provide sensor data for pose estimation, as described in connection with pose estimation module 915 in FIG. 9. Imaging cameras and/or depth sensors may be arranged such that a captured field of view corresponds with the field of view as seen by an end user of HMD 1000. In some implementations, HMD 1000 includes two or more front facing cameras (for example, one on each temple) in order to obtain depth from stereo information associated with a field of view captured by the front facing cameras. Right temple 1002 also includes a motion and orientation sensor 1038 and a GPS receiver 1032, which may be employed to provide sensor data for pose estimation. Motion and orientation sensor 1038 may include a three-axis magnetometer, a three-axis gyro, and/or a three-axis accelerometer. In some implementations, the motion and orientation sensor 1038 includes an inertial measurement unit (IMU). The GPS receiver 1032 may determine a GPS location associated with HMD 1000. In some implementations, right temple 1002 also includes an eye tracking system 1021, which may also provide sensor data used for pose estimation. Examples of eye tracking systems are illustrated in U.S. Pat. No. 7,401,920, entitled "Head Mounted Eye Tracking and Display System" and issued on Jul. 22, 2008, and U.S. Pat. No. 8,998,414, entitled "Integrated Eye Tracking and Display System" and issued on Apr. 7, 2015, both of which are incorporated by reference herein in their entireties. Based on sensor data provided by eye tracking system 1021, HMD 1000 may be used to determine a location of a pupil, a center of rotation of an eyeball, an optical axis of an eyeball, and/or a gaze or viewing angle of an end user's eye. Such information may be used for dynamically generating a transformation for LSR.

In some implementations, eye glass 1016 includes an optical see-through display that allows concurrent viewing of a real-world environment and images generated by HMD 1000, which may be projected and/or displayed on the see-through display. The see-through display may display images of virtual objects by modulating light provided to the display, such as a liquid crystal on silicon (LCOS) display, or by generating light within the display, such as an OLED display. In other implementations, such as for a VR device or an AR device, a non-see-through display may be used instead.

In some implementations, system 900 may be arranged to perform LSR transformation for two or more display devices or display regions; for example, generating multiple transformed images that are concurrently displayed on the multiple displays or display regions. For example, in some implementations of HMD 1000, two separate display devices or two display regions of one display device are provided, one for the left eye and the other for the right eye. Different images are displayed to each eye, providing a stereoscopic view of virtual objects. For a first display or display region, first source image data is rendered accounting for a viewpoint associated with the first display or display region (for example, a location and/or gaze direction for a left eye); a first transform is dynamically generated; a first plurality of sampling positions selected; first transform data is generated; and a first transformed image is generated; much as described in connection with FIG. 10. Additionally, for a second display or display region, a different second source image data is rendered accounting for a viewpoint associated with the second display or display region (for example, a location and/or gaze direction for a right eye); a different second transform is dynamically generated; a second plurality of sampling positions selected (which may be different from the first plurality of sampling positions); different second transform data is generated; and a different second transformed image is generated. In some implementations, system 900 includes a separate LSR transform module, similar to LSR transform module 940 in FIG. 9, for each of the displays or display regions, while sharing other elements, such as pose estimation module 915, image rendering module 920, transform preprocessing module 925, CPU 930, and/or memory device 975. In some implementations, system 900 uses a single LSR transform module for multiple displays or display regions. Various approaches may be used for sharing the single LSR transform module. In some implementations, the LSR transform module is arranged to serially generate transformed images for one display or display region at a time. In some implementations, the LSR transform module is arranged to interleave generating transformed images, such as by proceeding to a next display after generating a subportion of a transformed image (such as one or more scanlines or tiles); for such implementations, memory 945 may concurrently store transform data for all of the displays or display regions. Similar adaptations may be applied to system 100.

FIG. 11 illustrates an example of use of LSR to generate a transformed image 1140 for an updated predicted pose 1130 from an initial source image data 1120 rendered based on an initial predicted pose 1110, as may be performed by the system 900 in FIG. 9 or the HMD 1000 in FIG. 10. In the example illustrated in FIG. 11, pose estimation module 915 determines an initial predicted pose 1110 for an end user based on sensor data provided by sensors 910. As illustrated in FIG. 10, for an HMD-based implementation, most or all of the sensors 910 (or at least sensors 910 providing data for pose estimation) may be included in or on the HMD. The initial predicted pose 1110 is generated for a first selected time in the near future; for example, an estimated or actual time during which an image is expected to be presented to the end user on display device 965.

Based on the initial predicted pose 1110 and information about a scene, models, images, and/or objects to be displayed to the end user, source image rendering module 920 generates initial source image data 1120 based on the initial predicted pose 1110. Usually, a field of view for the initial source image data 1120 is larger than a field of view for display 965, and a portion or portions of the initial source image data 1120 are used to generate updated images via LSR transform module 940. Much as described in previous examples, initial source image data 1120 is stored in memory device 975.

Typically, after initial source image data 1120 has been rendered based on the initial predicted pose 1110 (which may take a significant amount of time, computation, and/or energy in view of real-time processing resources and deadlines), sensors 910 have provided additional sensor data, which is used to generate an updated predicted pose 1130 for a second selected time. The second selected time may be approximately the first selected time (thereby providing a refined, and likely more accurate, predicted pose based on more recent sensor data), or another time around the first selected time. Transform preprocessing module 925 is arranged to dynamically generate a transformation, based on the updated predicted pose 1130, such as based on a difference between the initial predicted pose 1110 and the updated predicted pose 1130, and apply the generated transform for a plurality of sparsely disposed sampling positions to produce transform data. The transform data is used by LSR transform module 940 to transform a portion of the initial source image data 1120 stored in the memory device 975, much as described in connection with transform data 152, source image position estimation module 160, and post-rendering transformation module 170 in FIG. 1, to generate a transformed image 1140 for the updated predicted pose 1130. The transformed image 1140 is presented to the end user on the display device 965. The transform generated by the transform preprocessing module 925 may be dynamically generated based on a difference between the initial predicted pose 1110 and the updated predicted pose 1130. Additional inputs or factors may be used for dynamically generating the transformation; for example, a dynamic transformation may be generated based further on a pupil location relative to an optical surface. The second time for the updated predicted pose 1130 corresponds to an estimated or actual time during which transformed image 1140 is presented on display device 965.

Although not illustrated in FIG. 11, more than one transformed image may be generated from initial source image data 1120, in much the same manner as transformed image 1140. Based on yet further sensor data provided by sensors 910, a second updated predicted pose may be generated for a third selected time. For example, the third selected time may correspond to an image frame displayed after an image frame displaying transformed image 1140. Transform preprocessing module 925 may be arranged to dynamically generate a second transformation, based on the second updated predicted pose, such as based on a difference between the initial predicted pose 1110 and the second updated predicted pose, and apply the second transform for a plurality of sparsely disposed sampling positions to produce transform data. The second transform data is used by LSR transform module 940 to generate a second transformed image from initial source image data 1120 for display via display device 965. This may be repeated for additional image frames, with a new transform dynamically generated for each image frame, until a new source image data has been rendered. This approach allows source image data to be generated at a frame rate slower than transformed images are displayed to an end user.

Figure 12A:
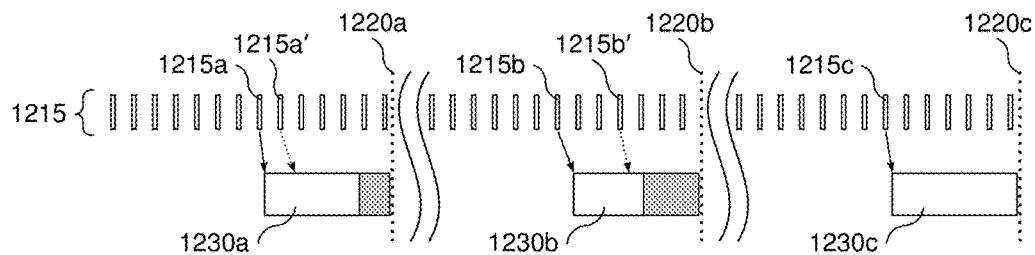
FIGS. 12A, 12B, and 12C illustrate timings and operation of various LSR implementations in comparison to the techniques described herein.
Figure 12B:
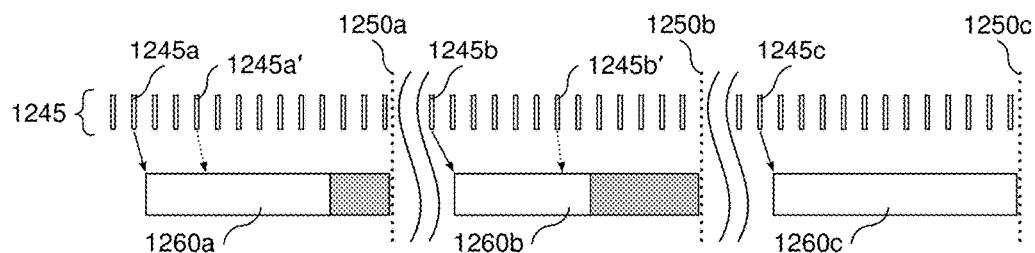
Figure 12C:
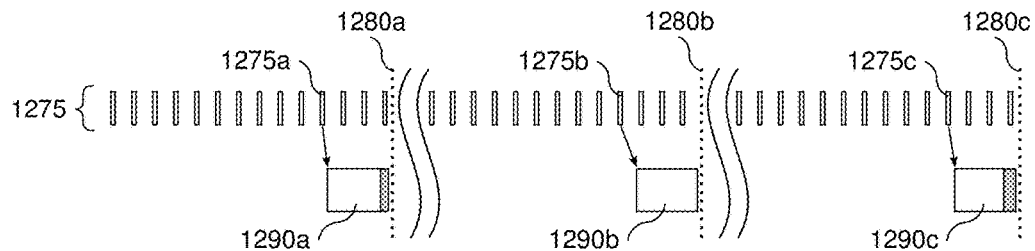

FIGS. 12A, 12B, and 12C illustrate timings and operation of various LSR implementations in comparison to the techniques described herein. The illustrated timings and frequencies is merely presented for discussion purposes, and is not intended to be to actual scale or frequencies. FIG. 12A illustrates an example of timings and operation for a conventional approach to performing LSR. The top row of FIG. 12A shows points in time when new updated predicted poses 1215 may be obtained based on additional sensor data having been received or obtained. For example, IMU sampling rates of 100 Hz or greater are relatively common. Deadlines 1320a, 1320b, and 1320c indicate real-time deadlines associated with displaying an updated image frame via a display device for completing LSR operations. On the left, a first LSR operation 1330a is performed which fully transforms all of the destination image locations. In some implementations, a simpler transformation that does not demand much computation is applied to reduce the duration of the first LSR operation 1330a to ensure that deadline 1320a is met. An updated predicted pose is obtained at 1215a, and used to for transforming a pre-rendered image. The first LSR operation 1330a takes the amount of time indicated by an unshaded portion, and a shaded portion shows unused time. Had it been known in advance how long the first LST operation 1330a would actually take, it could have been started later and had the benefit of a later, and likely more accurate, updated predicted pose 1215a'. However, as an amount of time or computation associated with the first LSR operation may vary, a conservative approach is used to ensure that deadline 1320a is fulfilled.

In the middle of FIG. 12A, a similar issue occurs, but to a greater degree. A second LSR operation 1330b, similar to the first LSR operation 1330a, is performed using an updated predicted pose 1215b. However, the second LSR operation 1330b completes fairly quickly. Again, had it been known in advance how long the second LST operation 1330b would actually take, it could have been started later and had the benefit of a significantly later later, and likely more accurate, updated predicted pose 1215b'. However, uncertainty in advance as to the time needed for the second LSR operation 1330b leads to it starting early.

On the right of FIG. 12A, a third LSR operation 1330c is performed based on updated predicted pose 1215c. However, the third LSR operation 1330c illustrates a "worst case" processing, in which all or nearly all of the time until deadline 1320c is used to perform the third LSR operation 1330c. It is because of such events that LSR operations are started earlier than sometimes needed to ensure real-time deadlines for completing LSR operations are achieved.

FIG. 12B illustrates an example of timings and operation for a conventional approach to performing LSR in which more complex transformations are performed. As a result, an amount of time required for a "worst case" processing, illustrated by a third LSR operation 1260c, is significantly longer than in FIG. 12A. Thus, the third LSR operation 1260c is started significantly earlier, and is based an updated predicted pose 1245c that is somewhat more remote from a time that the transformed image is displayed to an end user. This means that for other LSR operations, such as first LSR operation 1260a and second LSR operation 1260b, amounts of unused time are more pronounced than in FIG. 12A. Also, the differences in time between the actually used updated predicted poses 1245a and 1245b and the updated predicted poses 1245a' and 1245b' that might have been used are likewise more substantial.

FIG. 12C illustrates an example of timings and operation for the systems 900 and 1000 illustrated in FIGS. 9 and 10. By calculating estimated source image positions using stored transformation data instead of fully transformed source image positions, and performing full transformations for a sparse distribution of sampling positions, reasonably accurate LSR can be performed more quickly than in FIGS. 12A and 12B (allowing use of updated predicted poses 1275a, 1275b, and 1275c that are significantly closer in time to when transformed images are displayed, which reduces latency and improves the end user experience). Also, since the calculations performed by source image position estimation module 950 are a consistent amount of work, variations in the times for LSR operations 1290a, 1290b, and 1290c are reduced, which allows for more confidence in delaying the start of LSR processing for each image frame, allowing the use of more recent sensor data for pose prediction. Finally, such benefits are realized even where transformations more complex than those in FIG. 12B are performed.

Generally, functions described herein (for example, the features illustrated in FIGS. 1, 9, and 10) can be implemented using software, firmware, hardware (for example, fixed logic, finite state machines, and/or other circuits), or a combination of these implementations. The modules shown separately in FIGS. 1, 9, and 10 may or may not be implemented as separate modules. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

One such configuration of a machine-readable medium is signal bearing medium and thus is configured to transmit the instructions (e.g. as a carrier wave) to a device, such as via a network. The machine-readable medium may also be configured as a machine-readable storage medium and thus is not a signal bearing medium, and may be a non-transitory machine-readable storage medium. Examples of a machine-readable storage medium include a random-access memory (RAM), read-only memory (ROM), an optical disc, flash memory, hard disk memory, and other memory devices that may us magnetic, optical, and other techniques to store instructions and other data.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. An electronic device comprising:
    a transform generation module arranged to dynamically generate an image transformation between positions in a source space and corresponding positions in a destination space;
    a first memory arranged to receive and store transformation data;
    a transform data generation module arranged to:
        receive the image transformation from the transform generation module,
        generate first transformation data for a first sampling position by applying the image transformation generated by the transform generation module for the first sampling position,
        generate second transformation data for a second sampling position by applying the image transformation generated by the transform generation module for the second sampling position, and
        store the first and second transformation data in the first memory;
    a first image transformation stage arranged to:
        select the first and second transformation data for a first destination image position,
        calculate a first estimated source image position for the first destination image position based on the first and second transformation data selected by the first image transformation stage, and
        generate first data by performing a first operation using the calculated first estimated source image position;
    a second image transformation stage arranged to:
        select the first and second transformation data for the first destination image position,
        retrieve the selected first and second transformation data from the memory,
        recalculate the first estimated source image position for the first destination image position based on the first and second transformation data retrieved by the second image transformation stage, and
        generate first image data for the first destination image position using the recalculated first estimated source image position and the first data generated by the first rendering stage; and
    a post-rendering transformation module arranged to receive the first image data and generate a first transformed image based on the first image data.

2. The electronic device according to claim 1, further comprising:
    a second memory;
    a source image rendering module arranged to receive a three-dimensional model, render a first source image data based on the three-dimensional model, and store the first source image data in the second memory; and
    a source image data retrieval module arranged to receive the first estimated source image position and retrieve second source image data corresponding to the received first estimated source image position from the first source image data stored in the second memory, wherein the second image transformation stage is further arranged to generate the first image data based on the retrieved second source image data, and the device is arranged to calculate the first estimated source image position for the first image transformation stage at a time temporally distant from the recalculation of the first estimated source image position for the second image transformation stage.

3. The electronic device according to claim 1, wherein the transform data generation module is further arranged to generate intermediate transformation data, use the intermediate transformation data to generate the first transformation data, and use the intermediate transformation data to generate the second transformation data.

4. The electronic device according to claim 1, further comprising:
a sampling position selection module arranged to identify a set of sparsely distributed sampling positions consisting of a plurality of sampling positions, the first sampling position, and the second sampling position;
wherein the transform data generation module is further arranged to, for each sampling position included in the plurality of sampling positions, apply the image transformation generated by the transform generation module for the sampling position and store the generated transformation data in the first memory.

5. The electronic device according to claim 1, further comprising:
a pose estimation module arranged to determine a predicted pose for an end user; and
a source image rendering module adapted to render source image data from a three-dimensional model based on an initial predicted pose for the end user determined by the pose estimation module;
wherein the transform generation module is arranged to dynamically generate the image transformation based on an updated predicted pose for the end user determined by the pose estimation module.

6. The electronic device according to claim 5, further comprising:
a head-mounted display (HMD); and
a head-mounted sensor;
wherein:
the pose estimation module is further arranged to:
generate the initial predicted pose based on first sensor data obtained via the head-mounted sensor, and
generate the updated predicted pose based on second sensor data obtained via the head-mounted sensor after obtaining the first sensor data; and
the electronic device is arranged to display the first transformed image on the HMD.

7. The electronic device according to claim 1, wherein:
the first sampling position is a destination image position;
the second sampling position is a destination image position;
the transform generation module is arranged to dynamically generate a reverse image transformation for mapping pre-transformation positions in the destination space to corresponding post-transformation positions in the source space; and
the transform data generation module is arranged to:
apply the image transformation for the first sampling position by applying the reverse image transformation to the first sampling position to generate a corresponding first post-transformation source position,
generate the first transformation data based on the first post-transformation source position,
apply the generated image transformation for the second sampling position by applying the reverse image transformation to the second sampling position to generate a corresponding second post-transformation source position, and
generate the second transformation data based on the second post-transformation source position.

8. The electronic device according to claim 1, wherein:
the first sampling position is a source image position;
the second sampling position is a source image position;
the transform generation module is arranged to dynamically generate a forward image transformation for mapping pre-transformation positions in the source space to corresponding post-transformation positions in the destination space; and
the transform data generation module is arranged to:
apply the generated image transformation for the first sampling position by applying the forward image transformation to the first sampling position to generate a corresponding first post-transformation destination position,
generate the first transformation data based on the first post-transformation destination position,
apply the generated image transformation for the second sampling position by applying the forward transformation to the second sampling position to generate a corresponding second post-transformation destination position, and
generate the second transformation data based on the second post-transformation destination position.

9. The electronic device according to claim 1, wherein the transform generation module is further arranged to generate a combination and/or series of two-dimensional (2D) geometric image transformations for the image transformation, the 2D geometric image transformations including a predetermined 2D geometric image transformation and a dynamically generated 2D geometric image transformation.

10. The electronic device according to claim 1, wherein:
the electronic device is arranged to display successive first and second image frames on a display device, wherein the first image frame includes the first transformed image; and
the transform generation module is arranged to dynamically generate a second image transformation, that is different than the first image transformation, for use in generating a second transformed image included in the second image frame.

11. A method for multistage post-rendering image transformation comprising:
dynamically generating a first image transformation between positions in a source space and corresponding positions in a destination space;
generating first transformation data for a first sampling position by applying the generated first image transformation for the first sampling position;
generating second transformation data for a second sampling position by applying the generated first image transformation for the second sampling position;
storing the first and second transformation data in a first memory;

for a first image transformation stage, selecting the first and second transformation data for a first destination image position;

for the first stage, calculating a first estimated source image position for the first destination image position based on the first and second transformation data selected by the first image transformation stage;

for the first stage, generating first data by performing a first operation using the calculated first estimated source image position;

for a second image transformation stage, selecting the first and second transformation data for the first destination image position and retrieving the selected first and second transformation data from the first memory;

for the second stage, recalculating the first estimated source image position for the first destination image position based on the retrieved first and second transformation data;

generating first image data for the first destination image position using the recalculated first estimated source image position and the first data generated by the first rendering stage; and generating a first transformed image based on the generated first image data.

12. The method of claim 11, further comprising:
rendering first source image data based on a three-dimensional model;
storing the first source image data in a second memory; and
retrieving second source image data corresponding to the first estimated source image position from the first source image data stored in the second memory, wherein
the generating first image data is based on the retrieved second source image data, and
the calculating a first estimated source image position for the first stage is performed at a time temporally distant from the recalculating the first estimated source image position for the second stage.

13. The method of claim 11, wherein
the applying the generated first image transformation for the first sampling position includes generating intermediate transformation data and using the intermediate transformation data to generate the first transformation data; and
the applying the generated first image transformation for the second sampling position includes using the intermediate transformation data to generate the second transformation data.

14. The method of claim 11, further comprising:
identifying a set of sparsely distributed sampling positions consisting of a plurality of positions, the first sampling position, and the second sampling position; and
for each sampling position included in the plurality of sampling positions, generating a transformation data by applying the generated first image transformation for the sampling position and storing the generated transformation data in the first memory.

15. The method of claim 11, further comprising:
determining an initial predicted pose for an end user;
rendering source image data from a three-dimensional model based on the initial predicted pose; and
determining an updated predicted pose for the end user; wherein
the first image transformation is dynamically generated based on the updated predicted pose, and the first image data is generated based on a portion of the source image data corresponding to the first source image position.

16. The method of claim 15, further comprising:
receiving first sensor data from a head-mounted sensor;
generating the initial predicted pose based on the received first sensor data;
receiving second sensor data from the head-mounted sensor after receiving the first sensor data;
generating the updated predicted pose based on the received second sensor data; and
displaying the first transformed image on a head-mounted display (HMD).

17. The method of claim 11, wherein:
the first sampling position is a destination image position;
the applying the generated first image transformation for the first sampling position comprises applying a reverse image transformation to the first sampling position to generate corresponding first post-transformation source position;
the generating first transformation data for the first sampling position comprises encoding a value based on the first post-transformation source position;
the second sampling position is a destination image position;
the applying the generated first image transformation for the second sampling position comprises applying the reverse image transformation to the second sampling position to generate a corresponding second post-transformation source position; and
the generating second transformation data for the second sampling position comprises encoding a value based on the second post-transformation source position.

18. The method of claim 11, wherein:
the first sampling position is a source image position;
the applying the generated first image transformation for the first sampling position comprises applying a forward image transformation to the first sampling position to generate a corresponding first post-transformation destination position;
the generating first transformation data for the first sampling position comprises encoding a value based on the first post-transformation destination position;
the second sampling position is a source image position;
the applying the generated first image transformation for the second sampling position comprises applying the forward image transformation to the second sampling position to generate a corresponding second post-transformation destination position; and
the generating second transformation data for the second sampling position comprises encoding a value based on the second post-transformation destination position.

19. The method of claim 11, wherein the first image transformation is a combination and/or series of two-dimensional (2D) geometric image transformations, the 2D geometric image transformations including a predetermined 2D geometric image transformation and a dynamically generated 2D geometric image transformation.

20. The method of claim 11, further comprising:
displaying successive first and second image frames on a display device, wherein the first image frame includes the first transformed image; and
dynamically generating a second image transformation, that is different than the first image transformation, for generating a second transformed image included in the second image frame.

* * * * *